United States Patent
Kitamoto et al.

(10) Patent No.: US 12,126,062 B2
(45) Date of Patent: Oct. 22, 2024

(54) CONTROL DEVICE, POWER SUPPLY DEVICE, WORK MACHINE, CONTROL METHOD, AND COMPUTER-READABLE RECORDING MEDIUM

(71) Applicant: HONDA MOTOR CO., LTD., Tokyo (JP)

(72) Inventors: Ryota Kitamoto, Saitama (JP); Nobutaka Nakajima, Saitama (JP); Akira Yamada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 712 days.

(21) Appl. No.: 17/342,561

(22) Filed: Jun. 9, 2021

(65) Prior Publication Data

US 2021/0296666 A1 Sep. 23, 2021

Related U.S. Application Data

(63) Continuation of application No. PCT/JP2018/045950, filed on Dec. 13, 2018.

(51) Int. Cl.
*B60L 58/33* (2019.01)
*H01M 8/04537* (2016.01)

(52) U.S. Cl.
CPC ......... *H01M 8/04619* (2013.01); *B60L 58/33* (2019.02); *H01M 8/04589* (2013.01); *H01M 2250/20* (2013.01)

(58) Field of Classification Search
CPC ......... H01M 8/04619; H01M 8/04589; H01M 2250/20; H01M 8/04604; H01M 8/0494; H01M 8/04537; B60L 58/33; B60L 1/003; B60L 2200/40; B60L 58/14; B60L 58/16;

(Continued)

(56) References Cited

U.S. PATENT DOCUMENTS

| | | | | |
|---|---|---|---|---|
| 2006/0240298 A1* | 10/2006 | Yamada | .................. | B60L 50/71 429/442 |
| 2013/0078542 A1* | 3/2013 | Fukuma | ............ | H01M 8/04753 429/431 |
| 2016/0149226 A1* | 5/2016 | Usami | ............... | H01M 8/04225 429/535 |

FOREIGN PATENT DOCUMENTS

| | | | |
|---|---|---|---|
| JP | 2005108458 A | 4/2005 | |
| JP | 2010063265 A | 3/2010 | |

(Continued)

OTHER PUBLICATIONS

International Preliminary Report on Patentability for International Application No. PCT/JP2018/045950, issued by the International Bureau of WIPO on Jun. 8, 2021.

*Primary Examiner* — Rexford N Barnie
*Assistant Examiner* — Xuan Ly

(57) ABSTRACT

A control device for controlling a power supply device that supplies power to a work machine includes a load amount acquisition unit configured to acquire load information indicating a load amount of the work machine during a work period of the work machine, and an output condition determination unit configured to determine an output rate of a fuel cell based on the load amount indicated by the load information during the work period. The power supply device includes the fuel cell. The work period may be a period starting when information indicating start of work of the work machine is received and ending when information indicating end of the work of the work machine is received.

22 Claims, 12 Drawing Sheets

(58) Field of Classification Search
CPC .......... B60L 58/40; Y02T 90/40; Y02T 10/70; Y02T 10/7072; Y02T 90/14; Y02E 60/50
USPC ...................................................... 307/10.1
See application file for complete search history.

(56) References Cited

FOREIGN PATENT DOCUMENTS

| JP | 2013069485 A | 4/2013 |
| JP | 2016100311 A | 5/2016 |

\* cited by examiner

500

| TIME POINT | OUTPUT | | | OPERATION STATUS | | | |
|---|---|---|---|---|---|---|---|
| | VOLTAGE | CURRENT | RATE | TEMPERA-TURE | HUMIDITY | OPERATION MODE | OPERATION STATE |
| 2018/10/23 : | * | * | * | * | *** | OUTPUT PRIORITIZED | NORMAL OPERATION |
| 2018/10/23 : | * | * | * | * | *** | OUTPUT PRIORITIZED | IDLE OPERATION |
| 2018/10/23 : | * | * | * | * | *** | MAINTENANCE | – |
| 2018/10/24 : | * | * | * | * | *** | FUEL EFFICIENCY PRIORITIZED | NORMAL OPERATION |
| 2018/10/24 : | * | * | * | * | *** | DETERIORATION SUPPRESSION | NORMAL OPERATION |
| .. | .. | .. | .. | .. | .. | .. | .. |

522 — TIME POINT
524 — OUTPUT
526 — OPERATION STATUS

*FIG. 5*

| 600 | Elapsed Time After Shipment [hr] 632 | Cumulative Running Time [hr] 634 | Cumulative Power Generation Amount [kWh] 636 | Deterioration Level Scheduled Value 642 |
|---|---|---|---|---|
| | *** | *** | *** | *** |
| | *** | *** | *** | *** |
| | *** | *** | *** | *** |
| | : | : | : | : |
| | *** | *** | *** | DL (DESIGN LIFE) |

FIG. 6

| 822 | 832 | 834 | 836 | 842 DETERIORATION LEVEL [–] | |
|---|---|---|---|---|---|
| TIME POINT | ELAPSED TIME AFTER SHIPMENT [hr] | CUMULATIVE RUNNING TIME [hr] | CUMULATIVE POWER GENERATION AMOUNT [kWh] | SCHEDULED VALUE | CURRENT VALUE |
| 2018/10/23 \*\*:\*\* | \*\*\* | \*\*\* | \*\*\* | \*\*\* | \*\*\* |
| 2018/10/23 \*\*:\*\* | \*\*\* | \*\*\* | \*\*\* | \*\*\* | \*\*\* |
| 2018/10/23 \*\*:\*\* | \*\*\* | \*\*\* | \*\*\* | \*\*\* | \*\*\* |
| 2018/10/24 \*\*:\*\* | \*\*\* | \*\*\* | \*\*\* | \*\*\* | \*\*\* |
| 2018/10/24 \*\*:\*\* | \*\*\* | \*\*\* | \*\*\* | \*\*\* | \*\*\* |
| : | : | : | : | : | : |

CONTROL DEVICE, POWER SUPPLY DEVICE, WORK MACHINE, CONTROL METHOD, AND COMPUTER-READABLE RECORDING MEDIUM

The contents of the following international application are incorporated herein by reference:
PCT/JP2018/045950 filed in WO on Dec. 13, 2018.

BACKGROUND

Technical Field

The invention relates to a control device, a power supply device, a work machine, a control method, and a computer readable recording medium.

Background Art

A power generation device such as a fuel cell is installed as a power source of a work machine such as a vehicle in some cases. PTL 1 discloses suppression of performance deterioration of a fuel cell stack with a fuel cell unit controller causing a fuel cell system to perform micro power generation, when a sheet sensor provided to a driver's sheet for detecting whether a driver is seated detects that the driver is not seated.

CITATION LIST

Patent Literature

[PTL 1] Japanese Patent Application Publication No. 2010-063265

SUMMARY OF INVENTION

Technical Problem

With the invention described in PTL1, the deterioration of the power generation device cannot be suppressed in a period during which the driver is operating the work machine.

Solution to Problem

A first aspect of the present invention provides a control device. The control device controls a power supply device, for example. The power supply device supplies power to a work machine, for example. The power supply device includes a fuel cell, for example. The control device includes a load amount acquisition unit configured to acquire load information indicating a load amount of the work machine during a work period of the work machine, for example. The control device includes an output condition determination unit configured to determine an output rate of the fuel cell based on the load amount indicated by the load information, during the work period, for example.

In the control device, the work period may be a period starting when information indicating start of work of the work machine is received and ending when information indicating end of the work of the work machine is received. In the control device, the load information may include at least one of (i) information indicating a load amount of at least one of one or a plurality of electrically-powered equipment pieces that implement the work and (ii) information related to a work environment of the work machine.

In the control device, the load information may include the information related to the work environment of the work machine. In the control device, the output condition determination unit may include a load estimation unit configured to estimate the load amount based on the information related to the work environment. In the control device, the output condition determination unit may include a first upper limit value determination unit configured to determine an upper limit value of at least one of the output rate, an output current, and output power of the fuel cell, based on the load amount estimated by the load estimation unit.

In the control device, the output condition determination unit may include a deterioration estimation unit configured to estimate a deterioration level indicating a progress level of deterioration of the fuel cell. In the control device, the output condition determination unit may include a second upper limit value determination unit configured to determine an upper limit value of at least one of the output rate, an output current, and output power of the fuel cell based on the deterioration level estimated by the deterioration estimation unit.

In the control device, the work machine may include an accommodation unit configured to accommodate at least one of a human and an item. In the control device, the work machine may include an air conditioning unit configured to adjust an air environment in the accommodation unit. In the control device, the work machine may include a driving unit configured to move the work machine or the accommodation unit. The control device may include a power estimation unit configured to estimate power or a power amount consumed by the air conditioning unit. In the control device, the output condition determination unit may determine the output rate of the fuel cell based on the power or the power amount estimated by the power estimation unit. In the control device, the power supply device may be detachably attached to the work machine.

A second aspect of the present invention provides a power supply device. The above-described power supply device includes the control device, for example. The above-described power supply device includes a fuel cell, for example.

A third aspect of the present invention provides a work machine. The above-described work machine includes the above-described power supply device, for example. The above-described work machine includes an electric motor configured to convert electric energy supplied from the power supply device into mechanical energy, for example.

A fourth aspect of the present invention provides a control method. The above-described control method is a method of controlling a power supply device, for example. The above-described power supply device supplies power to a work machine, for example. The above-described power supply device includes a fuel cell, for example. The above-described control method includes acquiring load information indicating a load amount of the work machine during a work period of the work machine, for example. The above-described control method includes determining an output rate of the fuel cell based on the load amount indicated by the load information, during the work period, for example.

A fifth aspect of the present invention provides a program. A non-transitory computer-readable medium that stores the above-described program may be provided. The program may cause a computer to function as the above-described control device. The above-described program may be a program causing a computer to perform the above-described control method.

The summary clause does not necessarily describe all necessary features of the embodiments of the present invention. The present invention may be a sub-combination of the features described above.

BRIEF DESCRIPTION OF DRAWINGS

FIG. 5 schematically shows an example of a data table 500.

FIG. 6 schematically shows an example of a data table 600.

FIG. 8 schematically shows an example of a data table 800.

DESCRIPTION OF EMBODIMENTS

Figure 1:
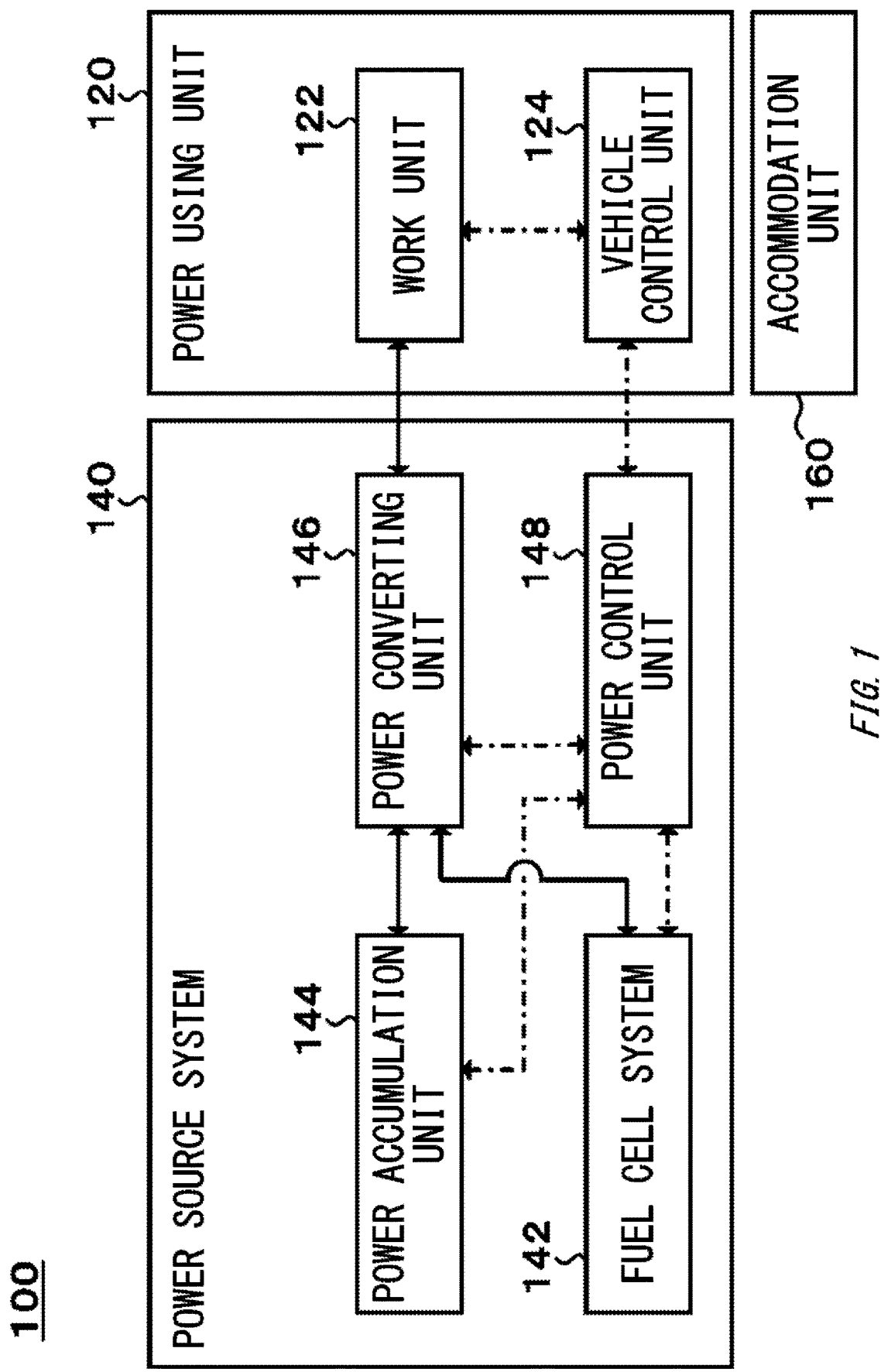
FIG. 1 schematically shows an example of a system configuration of a vehicle 100.

Hereinafter, the invention will be described through embodiments of the invention, but the following embodiments do not limit the invention according to claims. Also, all combinations of features described in the embodiments are not necessarily essential to solutions of the invention. Note that in the drawings, the same or similar parts may be given the same reference number to omit duplicate description.

[Overview of Vehicle 100]

FIG. 1 schematically shows an example of a system configuration of a vehicle 100. In the present embodiment, the vehicle 100 includes a power using unit 120 that performs various types of work using power. The vehicle 100 includes a power source system 140 that supplies power to each part of the vehicle 100. The vehicle 100 includes an accommodation unit 160 accommodating at least one of a human and an item.

In the present embodiment, the power using unit 120 includes a work unit 122 and a vehicle control unit 124. In the present embodiment, the power source system 140 includes a fuel cell system 142, a power accumulation unit 144, a power converting unit 146, and a power control unit 148. Each part of the vehicle 100 is configured to, for example, send and receive information to/from each other.

In the present embodiment, the vehicle 100 performs work to transport at least either of a human and an item (may be referred to as transporting work). The vehicle 100 may perform transporting work by a driver's operation, and also may perform transporting work by automatic driving. For reference, work to be performed by the vehicle 100 is not limited to transporting work. The vehicle 100 may perform any work, using power, instead of transporting work, or along with transporting work. For example, the vehicle 100 performs work for maintaining the temperature of the internal space of the accommodation unit 160 within a predetermined range.

Examples of the vehicle 100 include an automobile, a motorcycle, an electric train, and the like. Examples of the motorcycle include (i) a motorbike, (ii) a three-wheeled motorbike, (iii) a standing ride type two-wheeled or three-wheeled vehicle equipped with a power unit, like a Segway (registered trademark), a kick board (registered trademark) with a power unit, a skate board with a power unit, and the like.

In the present embodiment, the work unit 122 uses the power to perform various types of work. The work unit 122 may perform a single type of work, or may perform a plurality of types of work. Details of the work unit 122 will be described later.

In the present embodiment, the vehicle control unit 124 controls the vehicle 100. The vehicle control unit 124 may control the work unit 122. For example, the vehicle control unit 124 acquires information indicating the state of the work unit 122 from various sensors provided to the work unit 122. The vehicle control unit 124 may control the operation of the work unit 122. The vehicle control unit 124 may control power supply to the work unit 122.

The vehicle control unit 124 may control the power source system 140. For example, it acquires the information indicating the state of the power source system 140 from various kinds of sensors provided to the power source system 140. The vehicle control unit 124 may control the operation of the power source system 140. For example, if the power source system 140 includes a plurality of operation modes, the vehicle control unit 124 controls the operation mode of the power source system 140. The operation mode can be associated, for example, with an operation condition for prioritizing one or a plurality of properties selected from the group consisted of (i) a magnitude of the output power, (ii) a following property or responsiveness against an output instruction, (iii) a fuel efficiency or power generation efficiency, and (iv) inhibition of deterioration, over the other properties, which are not selected.

In the present embodiment, the fuel cell system 142 generates power using a fuel cell. The fuel cell system 142 may supply the generated power to the vehicle 100. For example, the fuel cell system 142 supplies the generated power to the power using unit 120. Details of the fuel cell system 142 will be described later.

In the present embodiment, the power accumulation unit 144 accumulates the power. The power accumulation unit 144 may supply accumulated power to the vehicle 100. For example, the power accumulation unit 144 supplies the accumulated power to the power using unit 120.

In the present embodiment, the power converting unit 146 converts the power. The power converting unit 146 may convert a direct current into an alternate current, may convert an alternate current into a direct current, or may convert an input direct voltage into another direct voltage. The power converting unit 146 may include a bidirectional DC-DC converter.

The power converting unit 146 may switch the power distribution state. The power converting unit 146 may switch the supply destination of the input power. The power converting unit 146 may supply the power generated by the fuel cell system 142 to the power using unit 120. The power converting unit 146 may supply the power generated by the fuel cell system 142 to the power accumulation unit 144. The power converting unit 146 may supply the power accumulated in the power accumulation unit 144 to the fuel cell system 142. The power converting unit 146 may supply the power accumulated by the power accumulation unit 144 to the power using unit 120. The power converting unit 146 may supply regenerative power from the power using unit 120 to the power accumulation unit 144.

In the present embodiment, the power control unit 148 controls the power converting unit 146. The power control unit 148 may control the power converting unit 146 to convert the power. The power control unit 148 may control the power converting unit 146 to accordingly control the timing of starting or stopping of power supply. The power control unit 148 may control the power converting unit 146 to accordingly control the supply destination of the input power. Details of the power control unit 148 will be described later.

The vehicle 100 may be an example of the work machine and the power supply device. The power using unit 120 may be an example of the work machine and the electrically-powered equipment. The work unit 122 may be an example of the work machine and the electrically-powered equipment. The power source system 140 may be an example of the power supply device. The fuel cell system 142 may be an example of the power supply device and the fuel cell. The power control unit 148 may be an example of the control device. The accommodation unit 160 may be an example of the accommodation unit. The transporting work may be an example of the work.

In the present embodiment, details of the vehicle 100 will be described in an example case where the power control unit 148 controls the fuel cell system 142 and the power source system 140. However, the vehicle 100 is not limited to the present embodiment. In another embodiment, the vehicle control unit 124 may have at least a part of the functions of the power control unit 148, and the vehicle control unit 124 may control the fuel cell system 142 and the power source system 140. In this case, the vehicle control unit 124 may be an example of the control device. In another embodiment, a computer installed in the fuel cell system 142 may have at least a part of the functions of the power control unit 148, and the vehicle control unit 124 may control the fuel cell system 142 and the power source system 140. In this case, the computer installed in the fuel cell system 142 may be an example of the control device.

In the present embodiment, details of the work machine that performs work is described, in an example case where the vehicle 100 performs conveyance work. However, the work machine is not limited to the vehicle 100. As other examples of the work machine, a conveyance apparatus, a transportation apparatus, a cleaning apparatus, an air conditioning apparatus, a lighting apparatus, a robot, etc. are exemplified. Examples of the conveyance apparatus include a moving body, a heavy machinery, an agricultural machine, a snow removing machine, an elevator, an escalator, etc. are exemplified. Examples of the moving body include a wheeled vehicle, a marine vessel, a flight vehicle, or the like. Examples of the marine vessel can include a ship, a hovercraft, a water bike, a submarine, a submersible craft, an underwater scooter, and the like. Examples of the flight vehicle can include an air plane, an air ship or a balloon, a hot-air balloon, a helicopter, a drone, and the like. Examples of the transportation apparatus include a pump, a blower, a sprayer, a cleaning machine, and the like. Examples of the cleaning apparatus include a vacuum cleaner, a washing machine, and the like.

[Concrete Configuration of Each Unit of Vehicle 100]

Each part of the vehicle 100 may be realized by hardware, may be realized by software, or may be realized by hardware and software. As for each part of the vehicle 100, at least a part thereof may be realized by a single server, or may be realized by a plurality of servers. As for each part of the vehicle 100, at least a part thereof may be realized on a virtual machine or on a cloud system. Each part of the vehicle 100 may be, at least partially, realized by a personal computer or a mobile terminal. Examples of the mobile terminal include a mobile phone, a smartphone, a PDA, a tablet, a notebook computer or a laptop computer, a wearable computer, or the like. Each part of the vehicle 100 may store information using a distributed register technology or a distributed network, such as a block chain.

If at least a part of the components configuring the vehicle 100 is realized by software, the component realized by the software may be realized by activating a program that defines the operation related to the component, in an information processing device having a common configuration. The information processing device includes, for example, (i) a data processing device having a processor such as a CPU or a GPU, a ROM, a RAM, a communication interface, or the like, (ii) an input device such as a keyboard, a touch panel, a camera, a microphone, various sensors, a GPS receiver, or the like, (iii) an output device such as a display device, a speaker, a vibrator, or the like and (iv) a storage device such as a memory, an HDD, or the like (including an external storage device).

In the information processing device, the data processing device or the storage device may store a program. The program may be stored in a non-transitory computer-readable recording medium. The program is executed by a processor to thereby cause the information processing device to execute operations defined by the program.

The program may be stored in a non-transitory computer-readable recording medium. The program may be stored in a computer-readable medium such as a CD-ROM, a DVD-ROM, a memory, a hard disk, or the like, or may be stored in a storage device connected to a network. The program may be installed to a computer which configures at least a part of the vehicle 100 from a storage device connected to a computer-readable medium or a network. The program may be performed to thereby make the computer function as at least a part of each part of the vehicle 100.

The program which makes the computer function as at least a part of each part of the vehicle 100 may comprise a module which defines the operation of each part of the vehicle 100. This program or module coerces on the data processing device, input device, output device, storage device, etc., to accordingly make the computer function as each part of the vehicle 100, or make the computer perform an information processing method at each part of the vehicle 100.

Information processing described in the program will, as the program is read by the computer, thereby function as a concrete means in which the software related to the program and various kinds of hardware resources of the vehicle 100 cooperate. And thus, the above-described concrete means realizes computation or processing of information associated with the purpose of use of the computer in the present embodiment, whereby the vehicle 100 associated with the purpose of use will be established.

The above-described program may be a program causing the computer to function as the controller for the fuel cell system 142. The above-described program may be a program causing the computer to perform an information processing method by the controller of the fuel cell system 142.

The above-described information processing method may be a control method of controlling the power supply device that supplies power to the work machine. The power supply device, for example, includes a fuel cell and a utility connection unit for transmitting and receiving utility used for the operation of the fuel cell between the work machine and the power supply device. The control method includes acquiring information indicating a rated value of the performance of the work machine to supply utility to the fuel cell, in response to the installation of the power supply device in the work machine or the power supply device becoming capable of using the utility, for example. The control method includes, for example, determining the operation condition of the power supply device based on the rated value.

Figure 2:
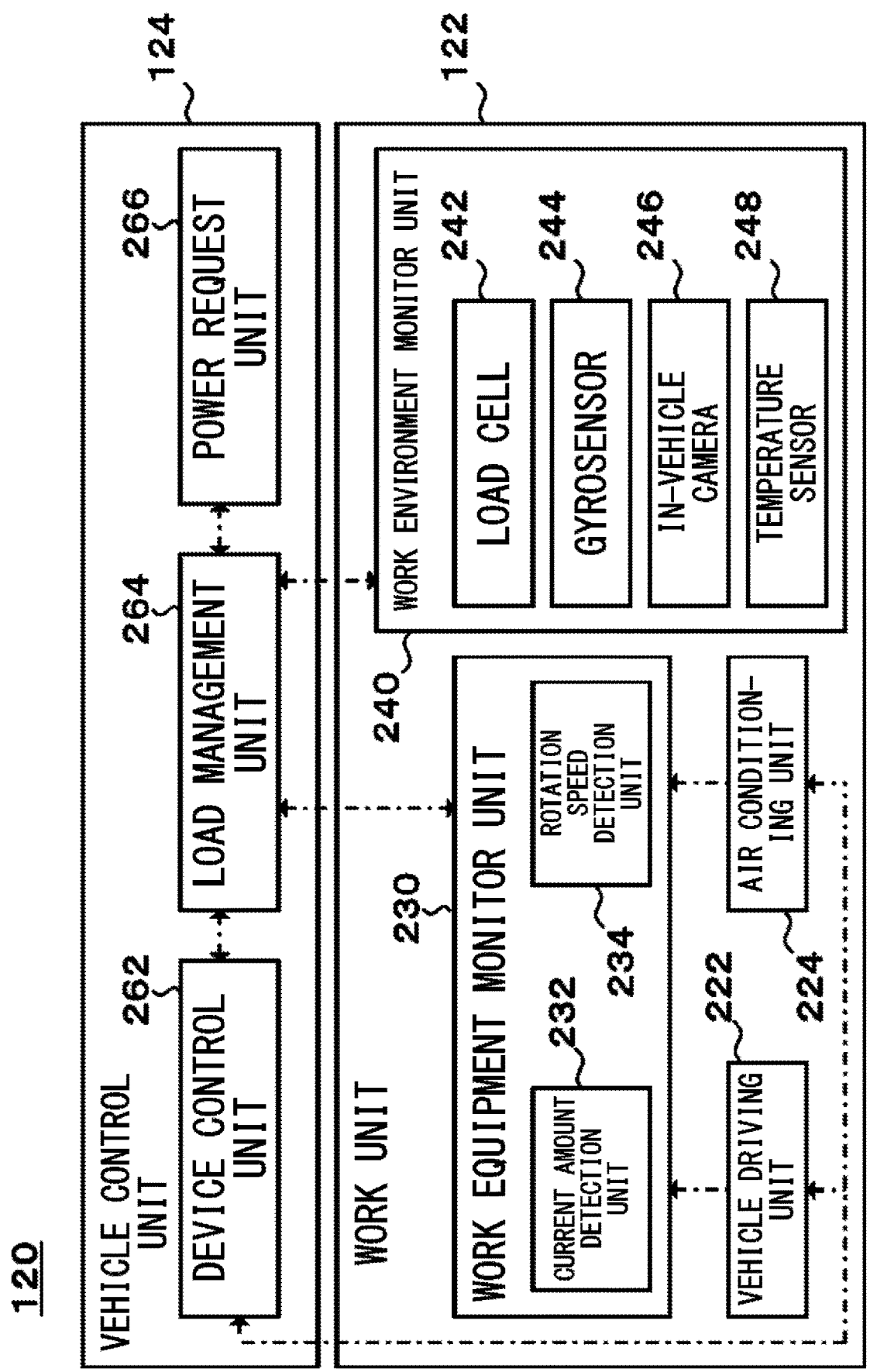
FIG. 2 schematically shows an example of an internal configuration of a power using unit 120.

FIG. 2 schematically shows an example of the internal configuration of the power using unit 120. As described above, in the present embodiment, the power using unit 120 includes the work unit 122 and the vehicle control unit 124. In the present embodiment, the work unit 122 includes a vehicle driving unit 222, an air conditioning unit 224, a work equipment monitor unit 230, and a work environment monitor unit 240. In the present embodiment, the work equipment monitor unit 230 includes a current amount detection unit 232 and a rotation speed detection unit 234. In the present embodiment, the work environment monitor unit 240 includes a load cell 242, a gyrosensor 244, an in-vehicle camera 246, and a temperature sensor 248. In the present embodiment, the vehicle control unit 124 includes a device control unit 262, a load management unit 264, and a power request unit 266. The parts of the vehicle control unit 124 are configured to transmit and receive information to and from each other, for example.

In the present embodiment, the vehicle driving unit 222 operates the vehicle 100. Thus, the vehicle driving unit 222 can move the accommodation unit 160. As a result, the transporting work of a human or an item accommodated in the accommodation unit 160 is performed.

In the present embodiment, the air conditioning unit 224 adjusts the air environment of the accommodation unit 160. For example, the air conditioning unit 224 adjusts the temperature in the accommodation unit 160. The air conditioning unit 224 may adjust the humidity in the accommodation unit 160. The air conditioning unit 224 may adjust the concentration of a particular matter contained in the air inside the accommodation unit 160.

In the present embodiment, the work equipment monitor unit 230 monitors the state of each of one or a plurality of electrically-powered equipment pieces that perform the work. For example, the work equipment monitor unit 230 acquires information indicating the state of each of one or a plurality of electrically-powered equipment pieces from one or a plurality of sensors provided to the vehicle 100. The work equipment monitor unit 230 may transmit information indicating the state of the work environment of the vehicle 100 to the load management unit 264.

In the present embodiment, the current amount detection unit 232 detects the current amount of an electric motor (not illustrated) of the vehicle driving unit 222, for example. The current amount detection unit 232 may detect the current amount of the electric motor (not illustrated) of the air conditioning unit 224. The current amount detection unit 232 may output data indicating a measurement result to the load management unit 264.

In the present embodiment, the rotation speed detection unit 234 detects the rotation speed of the electric motor of the vehicle driving unit 222, for example. The rotation speed detection unit 234 may detect the rotation speed of the electric motor of the air conditioning unit 224. The rotation speed detection unit 234 may output data indicating a measurement result to the load management unit 264.

In the present embodiment, the work environment monitor unit 240 monitors the state of the work environment of the vehicle 100. For example, the work environment monitor unit 240 acquires information indicating the state of the work environment of the vehicle 100 from one or a plurality of sensors provided to the vehicle 100. The work environment monitor unit 240 may acquire information indicating the state of the work environment of the vehicle 100 from one or a plurality of sensors provided outside the vehicle 100. The work equipment monitor unit 230 may transmit the information indicating the state of the work environment of the vehicle 100 to the load management unit 264.

In the present embodiment, the load cell 242 measures the weight of the vehicle 100 or the accommodation unit 160. The load cell 242 may output data indicating a measurement result to the load management unit 264. In the present embodiment, the gyrosensor 244 measures the inclination of the vehicle 100 or the accommodation unit 160. The above-described inclination may by an angle formed with the vertical direction. The gyrosensor 244 may output data indicating a measurement result to the load management unit 264.

In the present embodiment, the in-vehicle camera 246 captures an image of the inside of the accommodation unit 160. The in-vehicle camera 246 may capture an image of the outside of the accommodation unit 160. The in-vehicle camera 246 may capture an image of the outside of vehicle 100. The in-vehicle camera 246 may capture an image of a work target of the vehicle 100. The in-vehicle camera 246 may capture a still image and may capture a movie. The in-vehicle camera 246 may capture a visible light image and may capture an invisible light image. Examples of the invisible light image include an infrared image, an ultraviolet image, and the like. The in-vehicle camera 246 may output data of the captured image to the load management unit 264.

In the present embodiment, the temperature sensor 248 measures the temperature inside the accommodation unit 160. The temperature sensor 248 may measure the temperature outside the accommodation unit 160. The temperature sensor 248 may measure the temperature outside the vehicle 100. The temperature sensor 248 may measure the temperature of the work target of the vehicle 100. The temperature sensor 248 may employ a contact or contactless measurement scheme. When the in-vehicle camera 246 captures an infrared image, the temperature sensor 248 may measure the temperature by analyzing the infrared image. The temperature sensor 248 may output data indicating a measurement result to the load management unit 264.

In the present embodiment, the device control unit 262 controls various devices provided to the work unit 122. The device control unit 262 may control the operation of at least one of the vehicle driving unit 222 and the air conditioning unit 224.

For example, the device control unit 262 acquires the information indicating the state of the vehicle driving unit 222 from the load management unit 264. The device control unit 262 may acquire the information related to the state of the work target of the vehicle driving unit 222 from the load management unit 264. The device control unit 262 determines the type and the operation amount of the operation of the vehicle driving unit 222 based on the current value and the target value of the state of the vehicle driving unit 222. The device control unit 262 may determine the type and the operation amount of the operation of the vehicle driving unit 222 based on the current value and the target value of the state of the vehicle driving unit 222 and the current value and the target value of the state of the work target of the vehicle driving unit 222. The device control unit 262 may output the above-described determined matters to the load management unit 264. The device control unit 262 may control the operation of the vehicle driving unit 222 in accordance with the above-described determined matters.

Similarly, the device control unit 262 acquires the information indicating the state of the air conditioning unit 224 from the load management unit 264. The device control unit 262 may acquire the information related to the state of the work target of the air conditioning unit 224 from the load management unit 264. The device control unit 262 determines the type and the operation amount of the operation of the air conditioning unit 224 based on the current value and the target value of the state of the air conditioning unit 224. The device control unit 262 may determine the type and the operation amount of the operation of the air conditioning unit 224 based on the current value and the target value of the state of the air conditioning unit 224 and the current value and the target value of the state of the work target of the air conditioning unit 224. The device control unit 262 may output the above-described determined matters to the load management unit 264. The device control unit 262 may control the operation of the air conditioning unit 224 in accordance with the above-described determined matters.

In the present embodiment, the load management unit 264 manages information related to the load amount of the work unit 122. The load management unit 264 may acquire information indicating the state of at least one of the vehicle driving unit 222 and the air conditioning unit 224 from each part of the work equipment monitor unit 230. The information indicating the state of the work environment of the vehicle 100 may be acquired from each part of the work environment monitor unit 240. The load management unit 264 may acquire the information related to the operation of at least one of the vehicle driving unit 222 and the air conditioning unit 224 from the device control unit 262. The information related to the operation may be information indicating the type and the operation amount of the operation.

The load management unit 264 may store and manage the acquired information in any storage device. The load management unit 264 may transmit the acquired information to the power control unit 148. The load management unit 264 may transmit the acquired information to an information processing device outside the vehicle 100, over a communication network.

In the present embodiment, the power request unit 266 outputs a request related to the power demand/supply of the work unit 122 to the power source system 140. Examples of the request related to the power demand/supply include (i) a request for designating at least one of the output voltage, the output current, the output power, and the output rate of the power source system 140, (ii) a request for increasing or reducing at least one of the output voltage, the output current, the output power, and the output rate of the power source system 140, (iii) a request for accumulating the regenerative power, and the like.

The vehicle driving unit 222 may be an example of the driving unit. The air conditioning unit 224 may be an example of the air conditioning unit. The work equipment monitor unit 230 may be an example of the load amount acquisition unit. The current amount detection unit 232 may be an example of the load amount acquisition unit. The rotation speed detection unit 234 may be an example of the load amount acquisition unit. The work environment monitor unit 240 may be an example of the load amount acquisition unit. The load cell 242 may be an example of the load amount acquisition unit. The gyrosensor 244 may be an example of the load amount acquisition unit. The in-vehicle camera 246 may be an example of the load amount acquisition unit. The temperature sensor 248 may be an example of the load amount acquisition unit.

The movement of the vehicle may be an example of the work. An adjustment of the air environment may be an example of the work. Various types of information indicating the respective states of one or a plurality of electrically-powered equipment pieces may be an example of the load information. Various types of information indicating the respective states of one or a plurality of electrically-powered equipment pieces may be an example of the information indicating the load amount of at least one of one or a plurality of electrically-powered equipment pieces that implements the work. Various types of information indicating the state of the work environment of the vehicle 100 may be an example of the load information. Various types of information indicating the state of the work environment of the vehicle 100 may be an example of the information related to the work environment of the work machine.

[Overview of Each Part of Fuel Cell System 142]

Figure 3:
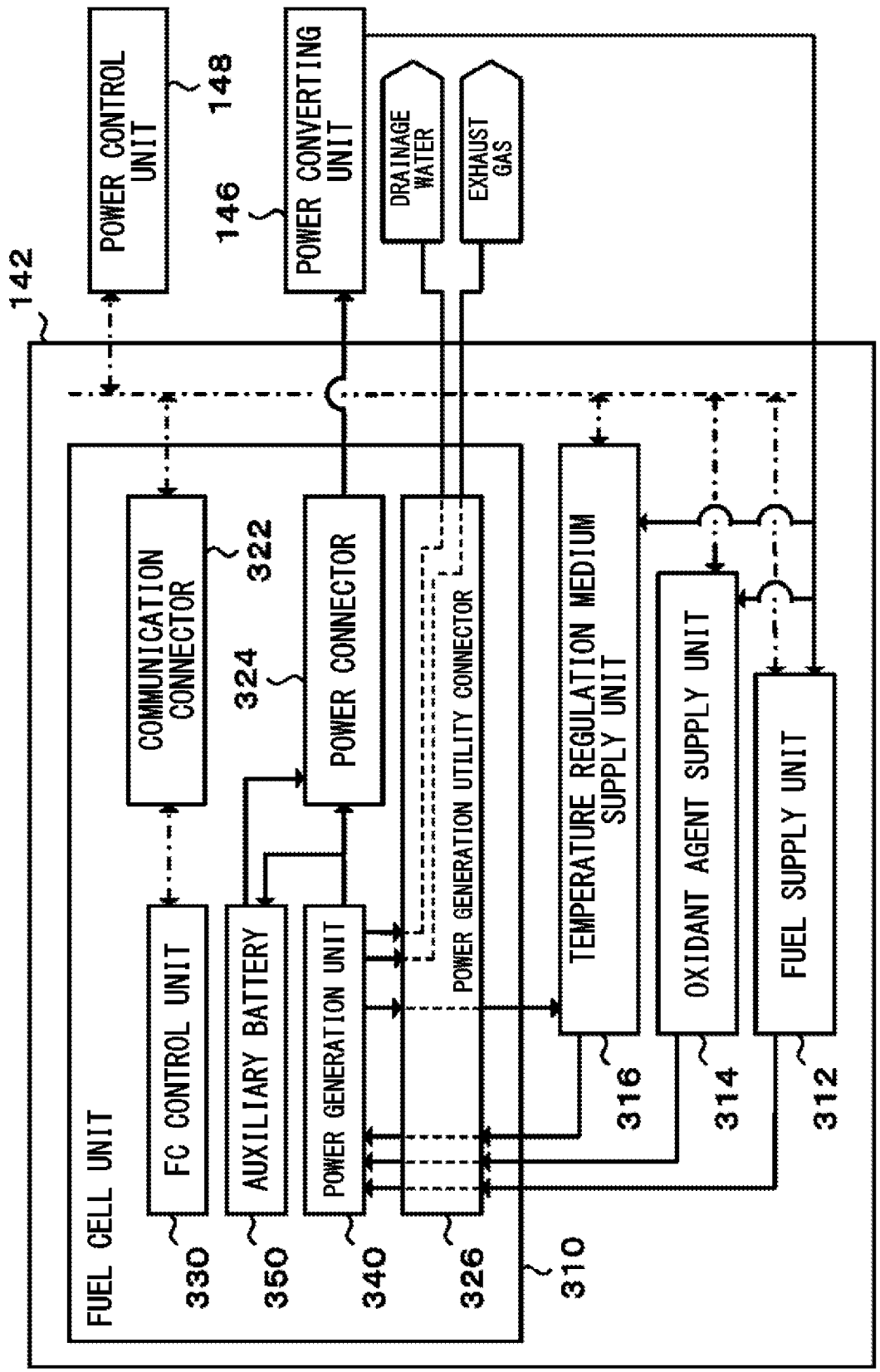
FIG. 3 schematically shows an example of an internal configuration of a fuel cell system 142.

FIG. 3 schematically shows an example of an internal configuration of the fuel cell system 142. In the present embodiment, the fuel cell system 142 includes a fuel cell unit 310, a fuel supply unit 312, an oxidant agent supply unit 314, and a temperature regulation medium supply unit 316. In the present embodiment, the fuel cell unit 310 includes a communication connector 322, a power connector 324, and a power generation utility connector 326. In the present embodiment, the fuel cell unit 310 includes an FC control unit 330, a power generation unit 340, and an auxiliary battery 350.

In the present embodiment, the fuel cell unit 310 uses the fuel supplied from the fuel supply unit 312 and the fuel supplied from the oxidant agent supply unit 314, to generate power. The temperature of the fuel cell unit 310 is regulated by the temperature regulation medium supplied from the temperature regulation medium supply unit 316. The power generated by the fuel cell unit 310 is, for example, supplied to each part of the vehicle 100, via the power converting unit 146. In the present embodiment, the fuel cell unit 310 may control the operation of at least one of the fuel supply unit 312, the oxidant agent supply unit 314, and the temperature regulation medium supply unit 316. The fuel cell unit 310 may operate in accordance with an instruction from the power control unit 148.

In the present embodiment, the fuel cell unit 310 may be a unit obtained by packaging at least the FC control unit 330, the power generation unit 340, piping, and wiring. The fuel cell unit 310 may be a unit obtained by packaging at least the FC control unit 330, the power generation unit 340, the auxiliary battery 350, piping, and wiring. The components of the fuel cell unit 310 may be housed in a single enclosure, or may be housed in a plurality of enclosures separately.

In the present embodiment, the fuel cell unit 310 is attached to the fuel cell system 142, for example, by being connected to the utility piping and the power cable provided to the fuel cell system 142. The fuel cell unit 310 may be attached to the fuel cell system 142, by being connected to the utility piping, the power cable, and the communication cable provided to the fuel cell system 142. By this, the fuel cell unit 310 is mounted to the vehicle 100.

In one embodiment, the fuel cell unit 310 is attached to the fuel cell system 142 so as not to be easily detached by a general user of the vehicle 100. The fuel cell unit 310 is fixed, for example, to a predetermined position of the fuel cell system 142.

In another embodiment, the fuel cell unit 310 is detachably attached to the fuel cell system 142. Thus, a general user of the vehicle 100 can attach the fuel cell unit 310 removed from the vehicle 100 to another work machine, and actuate the other work machine using the power generated by the fuel cell unit 310.

In the present embodiment, the fuel supply unit 312 supplies a fuel for power generation to the fuel cell unit 310. The fuel for power generation may be hydrogen, or may be a compound containing hydrogen. The fuel supply unit 312 may comprise a sensor (not shown) for measuring the flow rate of the fuel and a flow rate regulation unit (not shown) for regulating the flow rate of the fuel. The fuel supply unit 312 may operate in accordance with an instruction from the fuel cell unit 310.

In the present embodiment, the oxidant agent supply unit 314 supplies an oxidant agent for power generation to the fuel cell unit 310. The oxidant agent may be oxygen, or may be air. The oxidant agent supply unit 314 may comprise a sensor (not shown) for measuring the flow rate of the oxidant agent and a flow rate regulation unit (not shown) for regulating the flow rate of the oxidant agent. The oxidant agent supply unit 314 may operate in accordance with an instruction from the fuel cell unit 310.

The oxidant agent supply unit 314 may include a pump or a blower (not shown) for sucking air, serving as an oxidant agent, from outside the fuel cell system 142. The oxidant agent supply unit 314 may be connected to air supply piping (not shown) provided to the vehicle 100.

In the present embodiment, the temperature regulation medium supply unit 316 supplies a temperature regulation medium for regulating the temperature of the power generation stack of the fuel cell unit 310 to the fuel cell unit 310. Examples of the temperature regulation medium include water, an ethylene glycol, and a long life coolant (may be referred to as "LLC" in some cases), and the like. The temperature regulation medium supply unit 316 may comprise a sensor (not shown) for measuring the flow rate of the temperature regulation medium and a flow rate regulation unit (not shown) for regulating the flow rate of the temperature regulation medium. The temperature regulation medium supply unit 316 may operate in accordance with an instruction from the fuel cell unit 310. The temperature regulation medium supply unit 316 may comprise a heat exchanger (not shown) for regulating the temperature of the temperature regulation medium. An example of the heat exchanger includes a radiator.

[Overview of Each Part of Fuel Cell Unit 310]

In the present embodiment, the communication connector 322 connects a communication cable provided to the fuel cell unit 310 and a communication cable provided to the fuel cell system 142 to each other. The communication cable provided to the fuel cell unit 310 and the communication cable provided to the fuel cell system 142 may be connected wiredly or wirelessly. The fuel cell unit 310 may transmit and receive information to and from the communication cable provided to the fuel cell system 142, the power control unit 148, or the vehicle control unit 124 via a wireless communication device.

In the present embodiment, the power connector 324 electrically connects a power cable provided to the fuel cell unit 310 and a power cable provided to the fuel cell system 142 to each other. The power cable provided to the fuel cell unit 310 and the power cable provided to the fuel cell system 142 may be connected wiredly or wirelessly. The fuel cell unit 310 may be electrically connected to the power converting unit 146 or the work unit 122 via a wireless power supply device.

Thus, power can be transmitted and received between the fuel cell system 142 and the fuel cell unit 310. As a result, the power can be transmitted and received between the power converting unit 146 and the fuel cell unit 310, and the power can be transmitted and received between the work unit 122 or the power accumulation unit 144 and the fuel cell unit 310.

In the present embodiment, the power generation utility connector 326 connects the utility piping provided to the fuel cell unit 310 and the utility piping provided to the fuel cell system 142. By this, transmitting and receiving of the utility used for the operation of the fuel cell unit 310 becomes possible between the fuel cell system 142 and the fuel cell unit 310. As a result, transmitting and receiving of the utility becomes possible between the vehicle 100 or the fuel cell system 142 and the fuel cell unit 310.

For example, transmitting and receiving of the fuel becomes possible between the fuel supply unit 312 and the fuel cell unit 310. Transmitting and receiving of the oxidant agent becomes possible between the oxidant agent supply unit 314 and the fuel cell unit 310. Transmitting and receiving of a temperature regulation medium or heat becomes possible between the temperature regulation medium supply unit 316 and the fuel cell unit 310. Also, transmitting and receiving of drainage water and exhaust gas generated in association with the power generation at the fuel cell unit 310 becomes possible between the fuel cell unit 310 and the vehicle 100 or the fuel cell system 142.

In the present embodiment, the FC control unit 330 controls the fuel cell unit 310. For example, the FC control unit 330 controls the power generation of the fuel cell unit 310. The FC control unit 330 may control at least one of the output voltage, the output current, the output power and the output rate of the fuel cell unit 310. The FC control unit 330 may control the operation of at least one of the fuel supply unit 312, the oxidant agent supply unit 314, and the temperature regulation medium supply unit 316 to thereby control power generation of the fuel cell unit 310. The FC control unit 330 may operate in accordance with an instruction from the power control unit 148.

In the present embodiment, the power generation unit 340 generates the power. The power generation unit 340 may comprise a fuel cell. The fuel cell makes the fuel supplied from the fuel supply unit 312 and the oxidant agent supplied from the oxidant agent supply unit 314 react, to generate power. The power generation unit 340 may be electrically connected to the power connector 324. The power generation unit 340 may be electrically connected to the auxiliary battery 350. The power generation unit 340 may supply a part of the generated power to the auxiliary battery 350.

As stated above, in order to activate the power generation unit 340, power is necessary to activate the fuel supply unit 312 for supplying the oxidant agent and the fuel to the power generation unit as well as the oxidant agent supply unit 314. In particular, the oxidant agent supply unit 314 often comprise a fan for pressure-feeding air as the oxidant agent to the power generation unit 340. However, the amount of consumed power of the fan is comparatively large. Accordingly, in preparation for activation of the power generation unit 340, it is preferred that power for operating the oxidant agent supply unit 314 is secured.

In the present embodiment, the auxiliary battery 350 accumulates the power for activating at least one of the fuel supply unit 312, the oxidant agent supply unit 314, and the temperature regulation medium supply unit 316. The auxiliary battery 350 may accumulate the power for activating the oxidant agent supply unit 314. The auxiliary battery 350 may be electrically connected to the power connector 324. The auxiliary battery 350 may accumulate the power supplied from the power converting unit 146. The auxiliary battery 350 may be electrically connected to the power generation unit 340. The auxiliary battery 350 may accumulate the power supplied from the power generation unit 340.

For reference, at least one of the fuel supply unit 312, the oxidant agent supply unit 314, and the temperature regulation medium supply unit 316 may be configured to operate using the power supplied from the power accumulation unit 144 at the time of activation of the fuel cell unit 310. At least one of the fuel supply unit 312, the oxidant agent supply unit 314, and the temperature regulation medium supply unit 316 may be configured to operate using the power supplied from the power accumulation unit 144 at the time of activation of the fuel cell unit 310 and the power generated by the fuel cell unit 310.

At least one of the fuel supply unit 312, the oxidant agent supply unit 314, and the temperature regulation medium supply unit 316 may be configured to actuate using power supplied from the power accumulation unit 144 when the remaining capacity of the auxiliary battery 350 is outside of a predetermined numeric range at the time of activation of the fuel cell unit 310.

The "numeric range" is not limited to cases where both of an upper limit and a lower limit are defined. The "numeric range" may define only the upper limit, or may define only the lower limit.

The oxidant agent supply unit 314 may operate using the power generated by the power generation unit 340, after the power generation amount of the power generation unit 340 reaches to satisfy the predetermined condition. For example, if the power generation amount of the power generation unit 340 is smaller than a predetermined threshold, the oxidant agent supply unit 314 supplies the oxidant agent to the power generation unit 340, using the power supplied from the auxiliary battery 350 or the power accumulation unit 144. If the power generation amount of the power generation unit 340 is larger than the threshold, the oxidant agent supply unit 314 supplies the oxidant agent to the power generation unit 340, using the power generated by the power generation unit 340.

The supply amount of the oxidant agent where the oxidant agent supply unit 314 uses the power supplied from the auxiliary battery 350 or the power accumulation unit 144 may be smaller than the supply amount of the oxidant agent where the oxidant agent supply unit 314 uses the power generated by the power generation unit 340. If the oxidant agent supply unit 314 uses the power generated by the power generation unit 340, the supply amount of the oxidant agent may fluctuate in association with the magnitude of the power generated by the power generation unit 340. The supply amount of the oxidant agent may continuously fluctuate in association with the magnitude of the power generated by the power generation unit 340, or may gradually fluctuate.

Note that, in the present embodiment, details of the fuel cell unit 310 have been explained, taking a case where the fuel cell unit 310 does not include the fuel supply unit 312, the oxidant agent supply unit 314, and the temperature regulation medium supply unit 316 as an example. However, the fuel cell unit 310 is not limited to the present embodiment. In the present embodiment, the fuel cell unit 310 may include at least one of the fuel supply unit 312, the oxidant agent supply unit 314, and the temperature regulation medium supply unit 316.

In the present embodiment, details of the power source system 140 have been explained, taking a case where the fuel cell unit 310 is a packaged unit as an example. However, the power source system 140 is not limited to the present embodiment. In another embodiment, the fuel cell system 142 may be a packaged unit. Further in another embodiment, the power source system 140 may be a packaged unit.

In the present embodiment, details of the power source system 140 have been explained, taking a case where the fuel cell unit 310 is configured to be detachable to the fuel cell system 142 as an example. However, the power source system 140 is not limited to the present embodiment. In another embodiment, the fuel cell system 142 may be configured to be detachable to the power source system 140. Further in another embodiment, the power source system 140 may be configured to be detachable to the vehicle 100.

Figure 4:
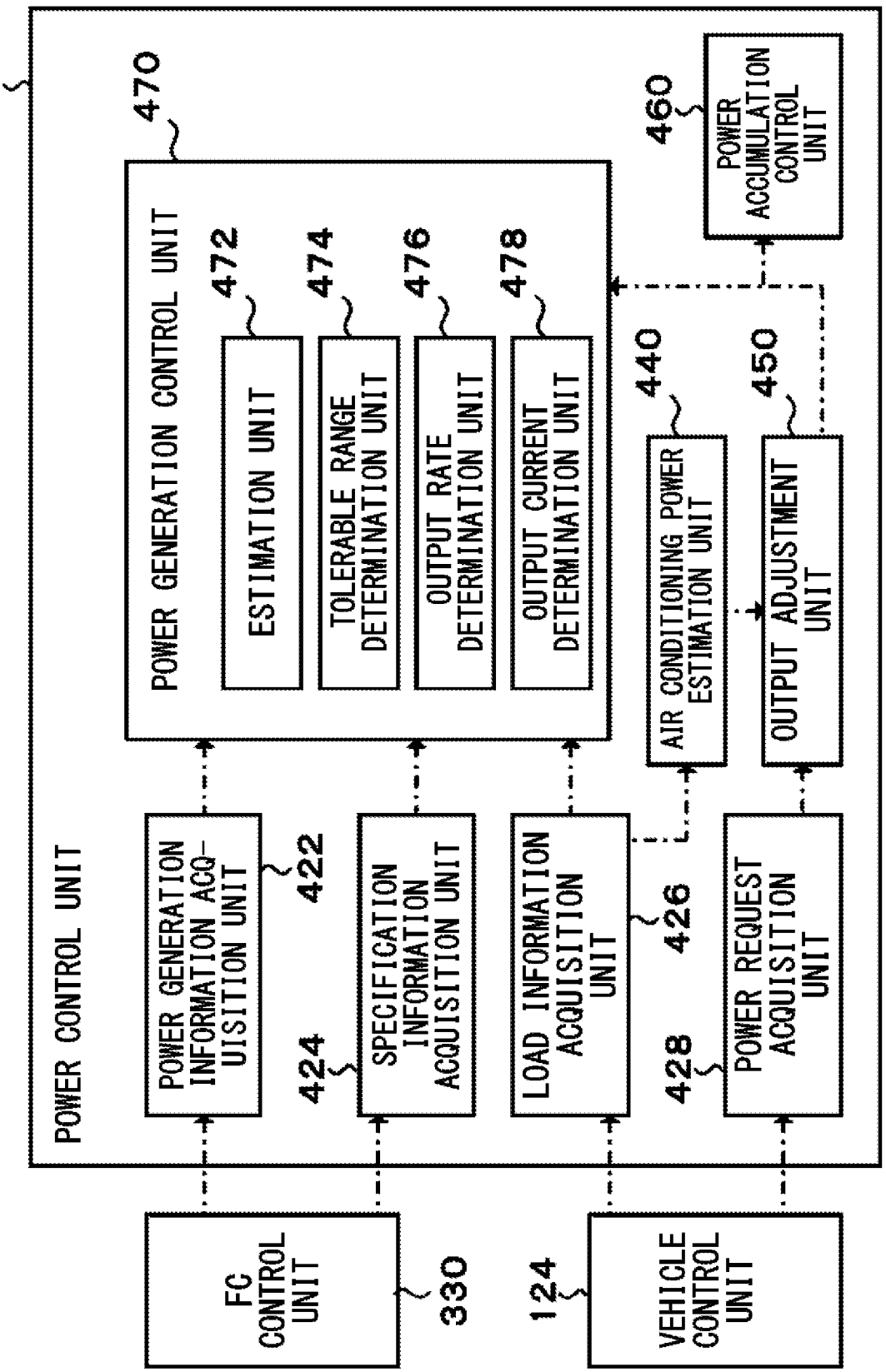
FIG. 4 schematically shows an example of an internal configuration of a power control unit 148.

FIG. 4 schematically shows an example of an internal configuration of the power control unit 148. In the present embodiment, power control unit 148 includes a power generation information acquisition unit 422, a specification information acquisition unit 424, a load information acquisition unit 426, a power request acquisition unit 428, an air conditioning power estimation unit 440, an output adjustment unit 450, a power accumulation control unit 460, and a power generation control unit 470. In the present embodiment, the power generation control unit 470 includes an estimation unit 472, a tolerable range determination unit 474, an output rate determination unit 476, and an output current determination unit 478.

In the present embodiment, the power generation information acquisition unit 422 acquires information related to a history of power generation by the fuel cell unit 310 (may be referred to as power generation information) from the FC control unit 330. Examples of the power generation information include the power generation amount of the fuel cell unit 310, the temperature of the fuel cell unit 310, the condition of the utility supplied to the fuel cell unit 310, the remaining capacity or SOC of the auxiliary battery 350, the remaining capacity or SOC of the power accumulation unit 144, and the like.

The power generation information acquisition unit 422 may output the power generation information to the estimation unit 472. The power generation information acquisition unit 422 may store and manage the power generation information in any storage device. The power generation information acquisition unit 422 may transmit the power generation information to an information processing device outside the vehicle 100 over the communication network.

In the present embodiment, the specification information acquisition unit 424 acquires information related to the specification of the fuel cell unit 310 (may be referred to as specification information) from the FC control unit 330. Examples of the specification information include (i) the rated value of at least one of the output voltage, the output current, the output power, and the output rate, (ii) deterioration property indicating a progress of deterioration under a certain condition, (iii) a data table, function, or model used for estimating an index (may be referred to as a deterioration level) indicating the current progress level of the deterioration, (iv) a target (may be referred to as design life) related to product life or service life, and the like.

The specification information acquisition unit 424 may transmit the specification information to the estimation unit 472. The specification information acquisition unit 424 may store and manage the specification information in any storage device. The specification information acquisition unit 424 may transmit the specification information to an information processing device outside the vehicle 100 over the communication network.

In the present embodiment, the load information acquisition unit 426 acquires information (may be referred to as load information) related to the load amount of the work unit 122 from the vehicle control unit 124. As described above, the load information includes, for example, at least one of (i) information indicating the state of at least one of the vehicle driving unit 222 and the air conditioning unit 224 and (ii) information indicating the state of the work environment of the vehicle 100. The information related to the load amount of the work unit 122 may include information related to the operation of at least one of the vehicle driving unit 222 and the air conditioning unit 224.

The load information acquisition unit 426 may acquire the load information from the vehicle control unit 124 during the work period of the vehicle 100. The work period may be a period starting when information indicating the start of the work of the vehicle 100 is received and ending when information indicating the end of the work of the vehicle 100 is received. The work period not only includes a period during which the work is actually performed by the vehicle 100, but also includes a period during which the work by the vehicle 100 is temporarily stopped.

For example, the load management unit 264 of the vehicle control unit 124 acquires information indicating that the work is to be temporarily stopped, from at least one of the work equipment monitor unit 230 and the work environment monitor unit 240. When the load management unit 264 acquires the above-described information, the device control unit 262 controls the work unit 122 to stop the work. The load management unit 264 acquires information indicating that the work temporarily stopped is to be resumed from the at least one of the work equipment monitor unit 230 and the work environment monitor unit 240. When the load management unit 264 acquires the above-described information, the device control unit 262 controls the work unit 122 to resume the work.

In one embodiment, when the vehicle 100 temporarily stops at a traffic signal provided on a route from a point of departure, the vehicle driving unit 222 of the work unit 122 temporarily stops the driving of the vehicle 100. As a result, the transporting work is temporarily stopped. However, in the above-described case, the vehicle 100 has not reached the destination yet, and the vehicle control unit 124 has not received information indicating the end of the transporting work. Thus, the transporting work continues. Then, when the traffic signal changes, the vehicle driving unit 222 resumes the driving of the vehicle 100. Thus, the transporting work resumes. The traffic signal may be an example of information indicating that the work is to be temporarily stopped, or information indicating that the work is to be resumed.

In another embodiment, when the air conditioning unit 224 adjusts the temperature in the accommodation unit 160, the air conditioning unit 224 may temporarily stop the operation of an air conditioning device such as a fan or a compressor, in response to the temperature in the accommodation unit 160 reaching a preset temperature. Thus, the air conditioning work is also temporarily stopped. However, in the above-described cases, the temperature sensor 248 of the work unit 122 is operating and the vehicle control unit 124 has not received information indicating the end of the air conditioning work. Thus, the air conditioning work continues. Then, when the temperature of the accommodation unit 160 falls out from the set range, the air conditioning unit 224 resumes the operation of the air conditioning device. Thus, the air conditioning work resumes. The information indicating that the temperature in the accommodation unit 160 is within the set range may be an example of the information indicating that the work is to be temporarily stopped. The information indicating that the temperature in the accommodation unit 160 is outside the set range may be an example of the information indicating that the work temporarily stopped is to be resumed.

In one embodiment, the vehicle control unit 124 receives information indicating the start of the work by the vehicle 100 from an input device (not shown) provided to the vehicle 100 or the power source system 140, or from a communication terminal (not shown) used by the user of the vehicle 100 for example. In another embodiment, the vehicle control unit 124 may determine the start of the work. When the start of the work is confirmed, the vehicle control unit 124 may generate the information indicating the start of the work by the vehicle 100 and transmit the information to the power control unit 148.

For example, the vehicle control unit 124 acquires information indicating the current position of the vehicle 100 from a self-localization device (for example a GPS signal receiver not shown) provided to the vehicle 100. The vehicle control unit 124 may confirm the start of the work when movement of the vehicle 100 from the starting point has been detected.

In one embodiment, for example, the vehicle control unit 124 receives information indicating the end of the work by the vehicle 100 from an input device (not shown) provided to the vehicle 100 or the power source system 140, or from a communication terminal (not shown) used by the user of the vehicle 100 for example. In another embodiment, the vehicle control unit 124 may determine the end of the work. When the end of the work is confirmed, the vehicle control unit 124 may generate the information indicating the end of the work by the vehicle 100 and transmit the information to the power control unit 148.

For example, vehicle control unit 124 acquires information indicating the current position of the vehicle 100 from a self-localization device (for example a GPS signal receiver not shown) provided to the vehicle 100. The vehicle control unit 124 may confirm the start of the work when arrival of the vehicle 100 at the destination point has been detected.

The load information acquisition unit 426 may transmit the load information to the estimation unit 472. The load information acquisition unit 426 may transmit the load information to the air conditioning power estimation unit 440. The load information acquisition unit 426 may store and manage the load information in any storage device. The load information acquisition unit 426 may transmit the load information to an information processing device outside the vehicle 100 over the communication network.

In the present embodiment, the power request acquisition unit 428 acquires the request related to the power demand/supply of the work unit 122 from the vehicle control unit 124. The power request acquisition unit 428 may transmit the request related to the power demand/supply of the work unit 122 to the output adjustment unit 450.

In the present embodiment, the air conditioning power estimation unit 440 estimates the power or power amount consumed by the air conditioning unit 224. For example, the air conditioning power estimation unit 440 acquires the load information from the load information acquisition unit 426. The air conditioning power estimation unit 440 may estimate the power or power amount consumed by the air conditioning unit 224 based on output data from the temperature sensor 248 included in the load information. The air conditioning power estimation unit 440 may estimate the power or power amount consumed by the air conditioning unit 224 based on (i) output data from the temperature sensor 248 and (ii) data on at least one of the current amount and the rotation speed of the electric motor of the air conditioning unit 224 included in the load information. The air conditioning power estimation unit 440 may output information indicating the estimation result of the power or the power amount consumed by the air conditioning unit 224 to the output adjustment unit 450.

In the present embodiment, the output adjustment unit 450 adjusts the output of the power source system 140. The output adjustment unit 450 may determine a condition of the power to be output from the fuel cell system 142. The output adjustment unit 450 may determine the condition of the power to be output from the power accumulation unit 144. Examples of the condition of the power include a voltage, a current, an output rate, a fluctuation range of these, and the like.

The output rate of the power source system 140 may be a magnitude of the power that can be output by the power source system 140 per unit time. The output rate of the power source system 140 may be a ratio of the magnitude of power that can be output by the power source system 140 per unit time to the rated value of the power supply performance of the power source system 140.

The output rate of the fuel cell system 142 may be magnitude of power that can be output by the fuel cell system 142 per unit time. The output rate of the fuel cell system 142 may be a ratio of the magnitude of power that can be output by the fuel cell system 142 per unit time to the rated value of the power generation performance of the fuel cell system 142.

The output rate of the power accumulation unit 144 may be magnitude of power that can be output by the power accumulation unit 144 per unit time. The output rate of the power accumulation unit 144 may be a ratio of the magnitude of power that can be output by the power accumulation unit 144 per unit time to the rated value of the discharge performance of the power accumulation unit 144. The output rate of the power accumulation unit 144 may be a ratio of the magnitude of power that can be output by the power accumulation unit 144 per unit time to the rated capacity of the power accumulation unit 144.

The duration of the unit time is not particularly limited. The duration of the unit time may be a second, a minute, n times as long as an operation period of the vehicle control unit 124 or the power control unit 148 (n is an integer that is equal to or larger than one), or m times as long as a communication period between the vehicle control unit 124 and the power control unit 148 (m is an integer that is equal to or larger than one).

For example, the output adjustment unit 450 acquires the request related to the power demand/supply of the work unit 122 from the power request acquisition unit 428. The output adjustment unit 450 determines the balance between outputs from the fuel cell system 142 and the power accumulation unit 144 based on the above-described request. Thus, the output adjustment unit 450 can determine the condition of the power output from each of the fuel cell system 142 and the power accumulation unit 144.

Examples of the balance between outputs include (i) a ratio of the output value of one of the fuel cell system 142 and the power accumulation unit 144 to the total value of the outputs of the fuel cell system 142 and the power accumulation unit 144, (ii) a ratio between the output value of the fuel cell system 142 and the output value of the power accumulation unit 144, and the like. Examples of the output include an output power amount, an output power, an output voltage, an output current, an output rate, and the like.

In one embodiment, when the demanded power or the demanded power amount of the work unit 122 indicated by the above-described request is smaller than a predetermined threshold, the output adjustment unit 450 may determine that the fuel cell system 142 operates under an output constant operation. The output adjustment unit 450 may determine that the power accumulation unit 144 supplies power to compensate for a difference between the demanded power or demanded power amount of the work unit 122 and the output power or output power amount of the fuel cell system 142. Thus, the power supply cost of the power source system 140 is reduced.

Under the output constant operation, the fuel cell system 142 maintains the output power or output current to be substantially constant. The target value of the output power or output current of the fuel cell system 142 under the output constant operation may be determined to set the power generation efficiency of the fuel cell system 142 to be equal to or larger than a predetermined value. The operation of the fuel cell system 142 in this case may be referred to as an efficient operation. The above-described target value may be determined by the output adjustment unit 450 or may be determined based on an initial setting at the time of shipment of the power source system 140 or the fuel cell system 142.

The target value may be determined based on a moving average value of the demanded power or demanded power amount of the work unit 122. The moving average value at a particular time point may be calculated as an average value of the demanded power or demanded power amount of the work unit 122 in a period having a predetermined duration with end point being the particular time point. The target value may be smaller than the moving average value of the demanded power or demanded power amount of the work unit 122. For example, the target value may be determined to be 75% or less of the moving average value of the demanded power or demanded power amount, may be determined to be 60% or less of the moving average value of the demanded power or demanded power amount, may be determined to be 50% or less of the moving average value of the demanded power or demanded power amount, may be determined to be 40% or less of the moving average value of the demanded power or demanded power amount, and may be determined to be 30% of the moving average value of the demanded power or demanded power amount.

On the other hand, when the demanded power or demanded power amount of the work unit 122 indicated by the request is larger than the predetermined threshold, the output adjustment unit 450 may determine that the power accumulation unit 144 supplies power with the rated power or rated current or with the maximum power or the maximum current. The output adjustment unit 450 may determine the fuel cell system 142 to operate to compensate for a difference between the demanded power or demanded power amount of the work unit 122 and the power or power amount output from the power accumulation unit 144. Thus, an excessive load is prevented from being applied to the power accumulation unit 144, whereby the durability of the power accumulation unit 144 is improved.

In another embodiment, when the moving average value of the demanded power or demanded power amount of the work unit 122 indicated by the above-described request is larger than a predetermined threshold, the output adjustment unit 450 may determine that the fuel cell system 142 operates under the output constant operation. The output adjustment unit 450 may determine that the power accumulation unit 144 supplies power to compensate for a difference between the demanded power or demanded power amount of the work unit 122 and the output power or output power amount of the fuel cell system 142. Thus, the efficiency of the power source system 140 is improved. Furthermore, the durability of the fuel cell system 142 is improved.

In this case, the output adjustment unit 450 may set the moving average value of the demanded power or demanded power amount of the work unit 122 to be the target value of the output power of the fuel cell system 142. The output adjustment unit 450 may determine the target value to set the target value of the output power of the fuel cell system 142 to be 80% or more and 120% or less of the moving average value of the demanded power or demanded power amount. The output adjustment unit 450 may determine the target value to set the target value of the output power of the fuel cell system 142 to be 90% or more and 110% or less of the moving average value of the demanded power or demanded power amount. The output adjustment unit 450 may determine the target value to set the target value of the output power of the fuel cell system 142 to be 95% or more and 105% or less of the moving average value of the demanded power or demanded power amount.

In another embodiment, when the moving average value of the demanded power or demanded power amount of the work unit 122 indicated by the above-described request is larger than the predetermined threshold, the output adjustment unit 450 may determine that the fuel cell system 142 operates to maintain a substantially constant output power or output current of the fuel cell system 142 within a range larger than the target value of the output power or output current under the efficient operation (may be referred to as a high output constant operation). The output adjustment unit 450 may determine that the power accumulation unit 144 supplies power to compensate for a difference between the demanded power or demanded power amount of the work unit 122 and the output power or output power amount of the fuel cell system 142. Thus, the efficiency of the power source system 140 is improved. Furthermore, the durability of the fuel cell system 142 is improved.

Under the high output constant operation, the fuel cell system 142 maintains the output power or output current to be substantially constant. The target value of the output power or output current of the fuel cell system 142 under the high output constant operation may be determined in a manner similar to that for determining the target value of the output power or output current under the efficient operation. As described above, the target value of the output power or output current of the fuel cell system 142 under the high output constant operation is selected as a value larger than the target value of the output power or output current under the efficient operation. The above-described target value may be determined by the output adjustment unit 450 or may be determined based on an initial setting at the time of shipment of the power source system 140 or the fuel cell system 142.

In the present embodiment, the output adjustment unit 450 acquires the information indicating the estimation result of the power or power amount consumed by the air conditioning unit 224 from the air conditioning power estimation unit 440. The output adjustment unit 450 may determine the balance between outputs from the fuel cell system 142 and the power accumulation unit 144 based on the above-described request and the information indicating the above-described estimation result. Thus, the output adjustment unit 450 can determine the condition of the power output from each of the fuel cell system 142 and the power accumulation unit 144.

The output adjustment unit 450 may determine the condition of the power to be output from the fuel cell system 142 based on the above-described request and the information indicating the above-described estimation result. Thus, for example, the power generation control unit 470 can determine at least one of the output rate, the output current and the output power of the fuel cell system 142 based on the estimation result of the power or power amount consumed by the air conditioning unit 224.

The output adjustment unit 450 may determine the condition of the power to be output from the power accumulation unit 144 based on the above-described request and the information indicating the above-described estimation result. Thus, for example, the power accumulation control unit 460 can determine at least one of the output rate, the output current, and the output power of the power accumulation unit 144 based on the estimation result of the power or power amount consumed by the air conditioning unit 224.

In one embodiment, when the estimation value of the consumed power or consumed power amount of the air conditioning unit 224 is smaller than a predetermined threshold, the output adjustment unit 450 may determine that the fuel cell system 142 operates under the efficient operation or idle operation, and the output adjustment unit 450 may determine to stop the fuel cell system 142. The output adjustment unit 450 may determine that the power accumulation unit 144 supplies power to compensate for a difference between (i) the sum of the demanded power or demanded power amount of the work unit 122 and the estimation value of the consumed power or consumed power amount of the air conditioning unit 224 and (ii) the output power or output power amount of the fuel cell system 142. The output constant operation may be efficient operation or may be the high output constant operation. The output constant operation is preferably the efficient operation.

Under the idle operation, the fuel cell system 142 operates in a state with a load further reduced from that in the minimum load operation state (may be referred to as minimum load) under the normal operation. The efficient operation and the high output constant operation may be an example of the normal operation Under the normal operation, the fuel cell system 142 may adjust the output power or output power amount in accordance with fluctuation of the required power or power amount.

In another embodiment, when the estimation value of the consumed power or consumed power amount of the air conditioning unit 224 is larger than the predetermined threshold, the output adjustment unit 450 determines that the air conditioning unit 224 is operated by the output power from the fuel cell system 142. In this case, the fuel cell system 142 may operate under the output constant operation and may operate under the idle operation. The output adjustment unit 450 may determine that the power accumulation unit 144 supplies power to compensate for a difference between (i) the sum of the demanded power or demanded power amount of the work unit 122 and the estimation value of the consumed power or consumed power amount of the air conditioning unit 224 and (ii) the output power or output power amount of the fuel cell system 142.

In another embodiment, the output adjustment unit 450 determines that (i) the air conditioning unit 224 is operated by the output from the fuel cell system 142 and (ii) the work unit 122 is operated by the output from the power accumulation unit 144. In another embodiment, the output adjustment unit 450 determines that (i) the work unit 122 is operated by the output from the fuel cell system 142 and (ii) the air conditioning unit 224 is operated by the output from the power accumulation unit 144.

In another embodiment, when the remaining capacity or SOC of the power accumulation unit 144 is larger than the estimation value of the power amount consumed by the air conditioning unit 224, the output adjustment unit 450 may determine that the fuel cell system 142 operates under the idle operation, and the output adjustment unit 450 may determine to stop the fuel cell system. The output adjustment unit 450 may determine that the power accumulation unit 144 supplies power to compensate for a difference between (i) the sum of the demanded power or demanded power amount of the work unit 122 and the estimation value of the consumed power or consumed power amount of the air conditioning unit 224 and (ii) the output power or output power amount of the fuel cell system 142.

On the other hand, when the remaining capacity or SOC of the power accumulation unit 144 is smaller than the estimation value of the power amount consumed by the air conditioning unit 224, the output adjustment unit 450 may determine that the fuel cell system 142 is operated by the output from the air conditioning unit 224, and the output adjustment unit 450 may determine that the work unit 122 and the air conditioning unit 224 are operated by the output from the fuel cell system 142.

The output adjustment unit 450 may output information indicating the condition of the power to be output from the fuel cell system 142 (may be referred to as information indicating the adjustment result) to the power generation control unit 470. The output adjustment unit 450 may output information indicating the condition of the power to be output from the power accumulation unit 144 (may be referred to as information indicating the adjustment result) to the power accumulation control unit 460.

In the present embodiment, the power accumulation control unit 460 controls the power accumulation unit 144. For example, the power accumulation control unit 460 controls the charging/discharging of the power accumulation unit 144. The power accumulation control unit 460 may control the power converting unit 146 to control the charging/discharging of the power accumulation unit 144. For example, the power accumulation control unit 460 acquires the information indicating the adjustment result of the output adjustment unit 450 from the output adjustment unit 450. The power accumulation control unit 460 controls the charging/discharging of the power accumulation unit 144 in accordance with the adjustment result of the output adjustment unit 450.

In the present embodiment, the power generation control unit 470 controls the fuel cell system 142. For example, the power generation control unit 470 controls the power generation by the fuel cell system 142. The power generation control unit 470 may control the FC control unit 330 to control the power generation by the fuel cell system 142.

For example, the power generation control unit 470 acquires the information indicating the adjustment result of the output adjustment unit 450 from the output adjustment unit 450. The power generation control unit 470 may determine whether the power generation is performed in accordance with the adjustment result of the output adjustment unit 450. When the power generation is determined to be performed in accordance with the adjustment result of the output adjustment unit 450, a condition indicated by the above-described adjustment result is transmitted to the FC control unit 330.

On the other hand, when the power generation is determined not to be performed in accordance with the adjustment result of the output adjustment unit 450, the power generation control unit 470 changes at least a part of the condition of the power to be output from the fuel cell system 142 indicated by the above-described adjustment result. For example, the power generation control unit 470 newly determines the output rate of the fuel cell system 142. The power generation control unit 470 transmits the changed condition to the FC control unit 330.

In the present embodiment, the estimation unit 472 estimates the current value or predicted value related to a particular physical quantity or index. The predicted value may be a predicted value at a particular time point in the future, or a predicted value in the near future. The near future may be within five seconds, within 10 seconds, within 30 seconds, within a minute, within five minutes, within 10 minutes, within 30 minutes, and within an hour.

[Estimation of Load Amount of Work Unit 122]

In one embodiment, the estimation unit 472 estimates the current value or predicted value of the load amount of the work unit 122. For example, the estimation unit 472 acquires the load information from the load information acquisition unit 426. The estimation unit 472 estimates the current value or predicted value of the load amount of the work unit 122 based on the information indicating the state of the work environment of the vehicle 100 included in the load information.

For example, the estimation unit 472 determines the mass of a human or an item accommodated in the accommodation unit 160 based on output data from at least one of the load cell 242 and the in-vehicle camera 246. The estimation unit 472 may estimate the current value of the load amount of the vehicle driving unit 222 based on the mass of the human or the item accommodated in the accommodation unit 160 and the output data from the gyrosensor 244.

As described above, the gyrosensor 244 measures the inclination of the vehicle 100 or the accommodation unit 160. Thus, for example, the estimation unit 472 can more accurately estimate each of the load amount of the vehicle driving unit 222 while the vehicle 100 drives uphill, and the load amount of the vehicle driving unit 222 while the vehicle 100 drives downhill.

The estimation unit 472 may estimate the current value of the load amount of the vehicle driving unit 222 based on the mass of the human or the item accommodated in the accommodation unit 160, the current position of the vehicle 100, and map information. The current position of the vehicle 100 may be estimated by any self-localization method. For example, the estimation unit 472 estimates the current position of the vehicle 100 based on a GPS signal received by a GPS signal receiver (not shown) installed in the vehicle 100. The map information including height information or inclination information at each position.

For example, the estimation unit 472 calculates the inclination of the vehicle 100 or the accommodation unit 160 at the current position of the vehicle 100 based on the information indicating the current position of the vehicle 100 and the map information. The estimation unit 472 may calculate the inclination of the vehicle 100 or the accommodation unit 160 at the current position of the vehicle 100 based on the inclination information at or in the vicinity of the current position of the vehicle 100. The estimation unit 472 may calculate the inclination of the vehicle 100 or the accommodation unit 160 at the current position of the vehicle 100 based on the height information at the current position of the vehicle 100 or the height information at a position in the vicinity of the current position of the vehicle 100. The above-described position in the vicinity may be a position on the route of the vehicle 100. Thus, for example, the estimation unit 472 can more accurately estimate the load amount of the load amount of the vehicle driving unit 222.

The estimation unit 472 may determine the mass of a human or an item expected to be accommodated in the accommodation unit 160 by analyzing an image of the outside of the vehicle 100 captured by the in-vehicle camera 246. For example, the estimation unit 472 determines the number of people who get in the vehicle 100 at a stop, a station, or the like by analyzing an image captured with the vehicle 100 stopped at the stop, the station, or the like. The estimation unit 472 may estimate the predicted value of the load amount of the vehicle driving unit 222 based on the mass of the human or the item expected to be accommodated in the accommodation unit 160.

The estimation unit 472 may determine the mass or volume of the human or the item accommodated in the accommodation unit 160 based on the output data from at least one of the load cell 242 and the in-vehicle camera 246. The estimation unit 472 may determine the temperature of the human or the item accommodated in the accommodation unit 160 based on the output data from the temperature sensor 248. The estimation unit 472 may estimate the current value or predicted value of the load amount of the air conditioning unit 224 based on the mass or volume of the human or the item accommodated in the accommodation unit 160, the temperature of the human or the item, and basic data related to a specific heat or radiation amount of the human or the item.

The estimation unit 472 may estimate the current value or predicted value of the load amount of the work unit 122 based on (i) information indicating the state of at least one of the vehicle driving unit 222 and the air conditioning unit 224 and (ii) information indicating the state of the work environment of the vehicle 100 included in the load information. The estimation unit 472 may estimate the current value or predicted value of the load amount of the work unit 122 based on (i) information indicating the state of at least one of the vehicle driving unit 222 and the air conditioning unit 224, (ii) information indicating the state of the work environment of the vehicle 100, and (iii) information related to the operation of at least one of the vehicle driving unit 222 and the air conditioning unit 224 included in the load information.

[Estimation of Deterioration Level of Power Source System 140]

In another embodiment, the estimation unit 472 estimates the current value or predicted value of the deterioration level of the fuel cell system 142. More specifically, the estimation unit 472 estimates the current value or predicted value of the deterioration level of the power generation stack of the power generation unit 340.

For example, the estimation unit 472 acquires the power generation information from the power generation information acquisition unit 422. The estimation unit 472 acquires the specification information from the specification information acquisition unit 424. The specification information includes a data table, a function, or a model used for estimating the deterioration level of the power generation stack based on the power generation information for example. The estimation unit 472 may estimate the current value of the deterioration level of the power generation stack of the power generation unit 340 based on the power generation information and the above-described data table, function, or model.

The objective variable of the above-described data table, function, or model may be the deterioration level of the power generation stack. The explanatory variable of the above-described data table, function, or model includes, for example, at least one of an elapsed time after the shipment, cumulative running time, cumulative power generation amount, cumulative start times, temperature history, and load history. The above-described data table, function, or model may include a single explanatory variable or include a plurality of explanatory variables.

The temperature history may be any information related to the temperature experienced by the power generation stack, and the detail thereof is not particularly limited. Examples of the temperature history include (i) a cumulative value of the temperature of the power generation stack within a particular period, (ii) a cumulative value of the temperature of the power generation stack within a period, in the particular period, during which the temperature of the power generation stack is within a predetermined numeric range, (iii) a cumulative value of the duration of the period, in the particular period, during which the temperature of the power generation stack is within the predetermined numeric range, (iv) a ratio of the duration of the period during which the temperature of the power generation stack is within the predetermined numeric range to the particular period, (v) the number of times the temperature of the power generation stack which has been outside the predetermined numeric range falls within the predetermined numeric range in the particular period, and the like. The particular period may have only the start point determined, have only the end point determined, or may have both the start point and the end point determined. The above-described numeric range may have only the upper limit value determined, have only the lower limit value determined, or may have both the upper limit value and the lower limit value determined.

The load history may be any information related to the load of the power generation stack, and the detail thereof is not particularly limited. Examples of the load include load power, load current, load voltage, and the like. Examples of the load history include (i) a cumulative value of the load of the power generation stack within a particular period, (ii) a cumulative value of the load of the power generation stack within a period, in the particular period, during which the load of the power generation stack is within a predetermined numeric range, (iii) a cumulative value of the duration of the period, in the particular period, during which the load of the power generation stack is within the predetermined numeric range, (iv) a ratio of the duration of the period during which the load of the power generation stack is within the predetermined numeric range to the particular period, (v) the number of times the load of the power generation stack which has been outside the predetermined numeric range falls within the predetermined numeric range in the particular period, and the like. The particular period may have only the start point determined, have only the end point determined, or may have both the start point and the end point determined. The above-described numeric range may have only the upper limit value determined, have only the lower limit value determined, or may have both the upper limit value and the lower limit value determined.

Similarly, the power generation information may include information related to at least one of the elapsed time after the shipment, cumulative running time, cumulative power generation amount, cumulative start times, temperature history, and load history. The estimation unit 472 can estimate the current value of the deterioration level of the power generation stack, with the power generation information indicating the current situation of the power generation stack to the above-described data table, function, or model for example.

The estimation unit 472 may estimate the current value of the deterioration level of the power generation stack of the power generation unit 340 based on a change in the I-V curve relative to the power generation history. When the fuel cell system 142 has a diagnosis mode for diagnosing the deterioration state of the fuel cell system 142, the estimation unit 472 may estimate the current value of the deterioration level of the power generation stack based on a result of the diagnosis mode. The Details of the diagnosis mode is not particularly limited, and a known method of diagnosing the deterioration and a method of diagnosing the deterioration to be developed in the future may be used. In the diagnosis mode, for example, pressure, pressure loss, internal resistance, and the like are inspected. The internal resistance is calculated using a known analysis method such as Cole-Cole plot from the measurement result obtained by an alternating current impedance method, for example.

As described above, the specification information may include information indicating the deterioration property of the power generation stack. The estimation unit 472 may estimate the predicted value of the deterioration level of the power generation stack of the power generation unit 340 at a particular time point in the future, based on the current value of the deterioration level, the information indicating the above-described deterioration property, and the information indicating the particular time point in the future.

In the present embodiment, the tolerable range determination unit 474 determines the tolerable range of the output of the fuel cell system 142. For example, the tolerable range determination unit 474 determines the upper limit value of at least one of the output rate, output current, and output power of the fuel cell system 142 or the power generation unit 340. The tolerable range determination unit 474 may determine the reference value of at least one of the output rate, output current, and output power of the fuel cell system 142 or the power generation unit 340. The tolerable range determination unit 474 may determine the lower limit value of at least one of the output rate, output current, and output power of the fuel cell system 142 or the power generation unit 340. The reference value may be a value smaller than the upper limit value and larger than the lower limit value.

[An Example Procedure for Determining Tolerable Range Based on Estimation Value of Load Amount]

In one embodiment, the tolerable range determination unit 474 acquires the information indicating the estimation result related to the current value or predicted value of the load amount of the work unit 122 from the estimation unit 472. The tolerable range determination unit 474 may determine the upper limit value based on the current value or predicted value of the load amount of the work unit 122. The tolerable range determination unit 474 may determine at least one of the upper limit value of the period in which the load amount of the work unit 122 may exceed the reference value and the upper limit value of the frequency at which the load amount of the work unit 122 exceeds the reference value.

The tolerable range determination unit 474 may estimate at least one of the period in which the load amount of the work unit 122 may exceed the reference value and the frequency at which the load amount of the work unit 122 exceeds the reference value in the particular period based on the current value or predicted value of the load amount of the work unit 122. The tolerable range determination unit 474 may determine the above-described upper limit value based on at least one of the duration of the above-described period and the magnitude of the above-described frequency.

[Upper Limit Value of Output Rate]

For example, the tolerable range determination unit 474 determines the upper limit value of the output rate to set a smaller upper limit value of the output rate for a larger load amount of the work unit 122. The tolerable range determination unit 474 may determine the upper limit value of the output rate to set a smaller upper limit value of the output rate for a longer duration of the period in which the load amount of the work unit 122 exceeds the reference value. The tolerable range determination unit 474 may determine the upper limit value of the output rate to set a smaller upper limit value of the output rate for a higher frequency at which the load amount of the work unit 122 exceeds the reference value.

The tolerable range determination unit 474 may determine the upper limit value of the output rate based on a difference or a ratio between a current value (A) of the load amount of the work unit 122 and a predicted value (B) of the load amount of the work unit 122 at a particular time point in the future. For example, the tolerable range determination unit 474 determines the upper limit value of the output rate to set a smaller upper limit value of the output rate for a smaller difference (A-B) between the current value (A) and the predicted value (B). For example, the tolerable range determination unit 474 may determine the upper limit value of the output rate to set a smaller upper limit value of the output rate for a smaller ratio (A/B) between the current value (A) to the predicted value (B).

[Upper Limit Value of Output Current]

For example, the tolerable range determination unit 474 determines the upper limit value of the output current to set a smaller upper limit value of the output current for a larger load amount of the work unit 122. The upper limit value of the output power may be determined based on the upper limit value of the output current.

The tolerable range determination unit 474 may determine the upper limit value of the output current to set a smaller upper limit value of the output current for a longer duration of the period in which the load amount of the work unit 122 exceeds the reference value. The tolerable range determination unit 474 may determine the upper limit value of the output current to set a smaller upper limit value of the output current for a higher frequency at which the load amount of the work unit 122 exceeds the reference value.

The tolerable range determination unit 474 may determine the upper limit value of the output current based on a difference or a ratio between a current value (A) of the load amount of the work unit 122 and a predicted value (B) of the load amount of the work unit 122 at a particular time point in the future. For example, the tolerable range determination unit 474 determines the upper limit value of the output current to set a smaller upper limit value of the output current for a larger difference (B-A) between the current value (A) and the predicted value (B). For example, the tolerable range determination unit 474 may determine the upper limit value of the output current to set a larger upper limit value of the output current for a larger ratio (A/B) of the current value (A) to the predicted value (B).

[Reference Value and Lower Limit Value of Output Rate]

The reference value and the lower limit value of the output rate are each determined based on the expected load amount of the work unit 122 and on the rated output and rated capacity of the power accumulation unit 144 for example. The reference value and the lower limit value of the output rate may each be determined based on a statistic related to the expected load amount of the work unit 122 and on the rated output and the rated capacity of the power accumulation unit 144. Examples of the statistic include the maximum value, minimum value, average value, median value, mode value, standard deviation, coefficient of variation, and the like. The reference value and the lower limit value of the output rate are each determined so as not to ruin the management or operation of the power accumulation unit 144 for example.

The lower limit value of the output rate may be determined based on the specification required for the vehicle 100 or the work unit 122. For example, when the work unit 122 is a motor that drives the vehicle 100, the lower limit value of the output rate is determined based on the driving performance of the vehicle 100. Examples of the driving performance include acceleration performance, maximum speed, maximum horse power, and the like.

[Reference Value and Lower Limit Value of Output Current]

The reference value and the lower limit value of the output current are each determined based on the expected load amount of the work unit 122 and on the rated output and rated capacity of the power accumulation unit 144 for example. The reference value and the lower limit value of the output current may each be determined based on a statistic related to the expected load amount of the work unit 122 and on the rated output and the rated capacity of the power accumulation unit 144. Examples of the statistic include the maximum value, minimum value, average value, median value, mode value, standard deviation, coefficient of variation, and the like. The reference value and the lower limit value of the output current are each determined so as not to ruin the management or operation of the power accumulation unit 144 for example.

The lower limit value of the output current may be determined based on the specification required for the vehicle 100 or the work unit 122. For example, when the work unit 122 is a motor that drives the vehicle 100, the lower limit value of the output current is determined based on the driving performance of the vehicle 100. Examples of the driving performance include acceleration performance, maximum speed, maximum horse power, and the like.

The reference value of the output power may be determined based on the reference value of the output current. The lower limit value of the output power may be determined based on the lower limit value of the output current.

[An Example of Procedure of Determining Tolerable Range Based on Estimation Value of Deterioration Level]

In another embodiment, the tolerable range determination unit 474 acquires the information indicating the estimation result related to the current value or predicted value of the deterioration level of the fuel cell system 142 from the estimation unit 472. The tolerable range determination unit 474 may determine the upper limit value based on the current value or predicted value of the deterioration level of the fuel cell system 142. The tolerable range determination unit 474 may determine at least one of the upper limit value of the period in which the deterioration level of the fuel cell system 142 may exceed the reference value and the upper limit value of the frequency at which the deterioration level of the fuel cell system 142 exceeds the reference value.

The tolerable range determination unit 474 may estimate at least one of the period in which the deterioration level of the fuel cell system 142 may exceed the reference value and the frequency at which the deterioration level of the fuel cell system 142 exceeds the reference value in the particular period based on the current value or predicted value of the deterioration level of the fuel cell system 142. The tolerable range determination unit 474 may determine the above-described upper limit value based on at least one of the duration of the above-described period and the magnitude of the above-described frequency.

[Upper Limit Value of Output Rate]

For example, the tolerable range determination unit 474 determines the upper limit value of the output rate to set a larger upper limit value of the output rate, for a larger delay of the progress level of the deterioration indicated by the current value of the deterioration level of the fuel cell system 142 from the progress level of deterioration indicated by a scheduled value of the deterioration level of the fuel cell system 142. In this case, the upper limit value of the output rate is determined to set a larger upper limit value of the output rate for a better current state of the fuel cell system 142.

The scheduled value of the deterioration level of the fuel cell system 142 is determined based on, for example, (i) information indicating the deterioration property of the power generation stack included in the specification information and (ii) information indicating the current value of at least one of the elapsed time after the shipment, cumulative running time, and cumulative power generation amount included in the power generation information. The information indicating the deterioration property of the power generation stack is determined based on test run or acceleration test during the development of the fuel cell system 142 or the fuel cell unit 310 for example. With the above-described test run or acceleration test, information in which at least one of the elapsed time after the shipment, cumulative running time, and cumulative power generation amount and the scheduled value of the deterioration level of the power generation stack are associated with each other is obtained.

The tolerable range determination unit 474 may determine the upper limit value of the output rate based on a difference or a ratio between a current value (A) of the deterioration level of the fuel cell system 142 and a scheduled value (B) of the deterioration level of the fuel cell system 142. For example, when a larger value of the deterioration level of the fuel cell system 142 indicates a further progress of deterioration of the fuel cell system 142, the tolerable range determination unit 474 determines the upper limit value of the output rate to set a larger upper limit value of the output rate for a smaller difference (A-B) between the current value (A) and the scheduled value (B). The tolerable range determination unit 474 may determine the upper limit value of the output rate to set a larger upper limit value of the output rate for a smaller ratio (A/B) between the current value (A) and the scheduled value value (B).

[Upper Limit Value of Output Current]

For example, the tolerable range determination unit 474 determines the upper limit value of the output current to set a upper limit value of the output current to be larger, when a delay of the progress level of the deterioration indicated by the current value of the deterioration level of the fuel cell system 142 is larger than the progress level of deterioration indicated by a scheduled value of the deterioration level of the fuel cell system 142. In this case, the upper limit value of the output current is determined to set a larger upper limit value of the output current for a better current state of the fuel cell system 142. The upper limit value of the output power may be determined based on the upper limit value of the output current.

The tolerable range determination unit 474 may determine the upper limit value of the output current based on a difference or a ratio between a current value (A) of the deterioration level of the fuel cell system 142 and a scheduled value (B) of the deterioration level of the fuel cell system 142. For example, when a larger value of the deterioration level of the fuel cell system 142 indicates a further progress of deterioration of the fuel cell system 142, the tolerable range determination unit 474 determines the upper limit value of the output current to set a larger upper limit value of the output current for a smaller difference (A-B) between the current value (A) and the scheduled value (B). The tolerable range determination unit 474 may determine the upper limit value of the output rate to set a larger upper limit value of the output rate for a smaller ratio (A/B) between the current value (A) and the scheduled value (B).

[Reference Value and Lower Limit Value of Output Rate]

The reference value and the lower limit value of the output rate are each determined based on the deterioration level of the fuel cell system 142 at the when the design life expectancy is reached, and on the rated output and rated capacity of the power accumulation unit 144 for example. The reference value and the lower limit value of the output rate are each determined so as not to ruin the management or operation of the power accumulation unit 144 for example when the fuel cell system 142 reaches the design life expectancy.

The lower limit value of the output rate may be determined based on the specification required for the vehicle 100 or the work unit 122. For example, when the work unit 122 is a motor that drives the vehicle 100, the lower limit value of the output rate is determined based on the driving performance of the vehicle 100. Examples of the driving performance include acceleration performance, maximum speed, maximum horse power, and the like.

[Reference Value and Lower Limit Value of Output Current]

The reference value and the lower limit value of the output current are each determined based on the deterioration level of the fuel cell system 142 at the when the design life expectancy is reached, and on the rated output and rated capacity of the power accumulation unit 144 for example. The reference value and the lower limit value of the output current are each determined so as not to ruin the management or operation of the power accumulation unit 144 for example when the fuel cell system 142 reaches the design life expectancy.

The lower limit value of the output current may be determined based on the specification required for the vehicle 100 or the work unit 122. For example, when the work unit 122 is a motor that drives the vehicle 100, the lower limit value of the output current is determined based on the driving performance of the vehicle 100. Examples of the driving performance include acceleration performance, maximum speed, maximum horse power, and the like.

The reference value of the output power may be determined based on the reference value of the output current. The lower limit value of the output power may be determined based on the lower limit value of the output current.

[An Example of Procedure of Determining Tolerable Range Based on Environment of Fuel Cell System 142]

In another embodiment, the tolerable range determination unit 474 may acquire the information indicating the environment of the fuel cell system 142. For example, the tolerable range determination unit 474 acquires information indicating at least one of the temperature and humidity of the fuel cell unit 310, as the information indicating the environment of the fuel cell system 142. The tolerable range determination unit 474 may determine the upper limit value based on the environment of the fuel cell system 142.

[Upper Limit Value of the Output Rate]

For example, the tolerable range determination unit 474 determines the upper limit value of the output rate to set a larger upper limit value of the output rate for a lower temperature of the fuel cell unit 310. The tolerable range determination unit 474 may determine the upper limit value of the output rate to set a larger upper limit value of the output rate for a higher humidity of the fuel cell unit 310.

[Upper Limit Value of Output Current]

For example, the tolerable range determination unit 474 may determine the upper limit value of the output current to set a larger upper limit value of the output current for a lower temperature of the fuel cell unit 310. The tolerable range determination unit 474 may determine the upper limit value of the output current to set a larger upper limit value of the output current for a higher humidity of the fuel cell unit 310.

[Reference Value and Lower Limit Value of Output Rate]

The reference value and the lower limit value of the output rate are each determined based on the expected environment of the fuel cell system 142 and the rated output and rated capacity of the power accumulation unit 144 for example. The reference value and the lower limit value of the output rate may each be determined based on a statistic related to the expected environment of the fuel cell system 142 and on the rated output and rated capacity of the power accumulation unit 144. Examples of the statistic include the maximum value, minimum value, average value, median value, mode value, standard deviation, coefficient of variation, and the like. The reference value and the lower limit value of the output rate are each determined so as not to ruin the management or operation of the power accumulation unit 144 for example.

The lower limit value of the output rate may be determined based on the specification required for the vehicle 100 or the work unit 122. For example, when the work unit 122 is a motor that drives the vehicle 100, the lower limit value of the output rate is determined based on the driving performance of the vehicle 100. Examples of the driving performance include acceleration performance, maximum speed, maximum horse power, and the like.

[Reference Value and Lower Limit Value of Output Current]

The reference value and the lower limit value of the output current are each determined based on the expected environment of the fuel cell system 142 and the rated output and rated capacity of the power accumulation unit 144 for example. The reference value and the lower limit value of the output current may each be determined based on a statistic related to the expected environment of the fuel cell system 142 and on the rated output and rated capacity of the power accumulation unit 144. Examples of the statistic include the maximum value, minimum value, average value, median value, mode value, standard deviation, coefficient of variation, and the like. The reference value and the lower limit value of the output current are each determined so as not to ruin the management or operation of the power accumulation unit 144 for example.

The lower limit value of the output current may be determined based on the specification required for the vehicle 100 or the work unit 122. For example, when the work unit 122 is a motor that drives the vehicle 100, the lower limit value of the output current is determined based on the driving performance of the vehicle 100. Examples of the driving performance include acceleration performance, maximum speed, maximum horse power, and the like.

The reference value of the output power may be determined based on the reference value of the output current. The lower limit value of the output power may be determined based on the lower limit value of the output current.

In the above description, the Details of the tolerable range determination unit 474 is described in an example where the tolerable range of the output rate and output current is determined based on the estimation value of the load amount, the estimation value of the deterioration level, or the environment of the fuel cell system 142. However, the tolerable range determination unit 474 is not limited to the present embodiment. In another embodiment, the tolerable range determination unit 474 may determine the tolerable range of at least one of the output rate and output current based on at least two of the estimation value of the load amount, the estimation value of the deterioration level, and the environment of the fuel cell system 142.

In the present embodiment, the output rate determination unit 476 determines the output rate of the fuel cell system 142 or the power generation unit 340. The output rate determination unit 476 may determine the output rate of the fuel cell system 142 or the power generation unit 340 during the work period of the vehicle 100.

For example, the output rate determination unit 476 acquires the load information from the load information acquisition unit 426. The output rate determination unit 476 determines the output rate of the fuel cell system 142 or the power generation unit 340 based on the load amount indicated by the load information. The output rate determination unit 476 may determine the output rate within the tolerable range determined by the tolerable range determination unit 474. The output rate determination unit 476 may determine the output rate to set a smaller output rate for a larger load amount. Thus, the deterioration of the fuel cell system 142 or the power generation unit 340 can be suppressed and the progress of the deterioration can be adjusted.

According to one embodiment, when the value of the load amount is within a predetermined numeric range and the output rate indicated by the adjustment result of the output adjustment unit 450 is within the tolerable range determined by the tolerable range determination unit 474, the output rate determination unit 476 determines to generate power with the output rate indicated by the adjustment result of the output adjustment unit 450. In this case, when the output rate indicated by the adjustment result of the output adjustment unit 450 exceeds the upper limit value of the tolerable range determined by the tolerable range determination unit 474, the output rate determination unit 476 may determine to generate power with the upper limit value determined by the tolerable range determination unit 474. When the output rate indicated by the adjustment result of the output adjustment unit 450 falls below the lower limit value of the tolerable range determined by the tolerable range determination unit 474, the output rate determination unit 476 may determine to generate power with the lower limit value determined by the tolerable range determination unit 474.

According to another embodiment, when the value of the load amount exceeds the upper limit value of the predetermined numeric range, the output rate determination unit 476 determines to generate power with an output rate smaller than the output rate indicated by the adjustment result of the output adjustment unit 450. The output rate determination unit 476 may determine the output rate to set a smaller output rate for a larger load amount, without reaching the output rate indicated by the adjustment result of the output adjustment unit 450.

In this case, the output rate determination unit 476 may determine to generate power with an output rate smaller than the reference value determined by the tolerable range determination unit 474. The output rate determination unit 476 may determine the output rate to set a smaller output rate for a larger load amount, without reaching the reference value determined by the tolerable range determination unit 474.

In the present embodiment, the load information may include at least one of the information indicating the current amount of the electric motor of at least one of the vehicle driving unit 222 and the air conditioning unit 224 and the information indicating the rotation speed of the electric motor. When the ratio (X/Y) of the rotation speed (X) of each electric motor to the current amount (Y) of the electric motor is smaller than a predetermined value, the output rate determination unit 476 may determine to increase the output rate within the tolerable range determined by the tolerable range determination unit 474.

Similarly, when a ratio of the rotation speed of the electric motor of the vehicle driving unit 222 to the current value of the load amount of the vehicle driving unit 222 estimated by the estimation unit 472 is smaller than a predetermined value, the output rate determination unit 476 may determine to increase the output rate within the tolerable range determined by the tolerable range determination unit 474. When a ratio of the rotation speed of the electric motor of the air conditioning unit 224 to the current value of the load amount of the air conditioning unit 224 estimated by the estimation unit 472 is smaller than a predetermined value, the output rate determination unit 476 may determine to increase the output rate within the tolerable range determined by the tolerable range determination unit 474.

In the present embodiment, the output current determination unit 478 determines the output current of the fuel cell system 142 or the power generation unit 340. The output current determination unit 478 may determine the output current of the fuel cell system 142 or the power generation unit 340 during the work period of the vehicle 100. The output current determination unit 478 may determine the output power based on the output current determined.

For example, the output current determination unit 478 acquires the load information from the load information acquisition unit 426. The output current determination unit 478 determines the output current of the fuel cell system 142 or the power generation unit 340 based on the load amount indicated by the load information. The output current determination unit 478 may determine the output current within the tolerable range determined by the tolerable range determination unit 474. The output current determination unit 478 may determine the output current to set a smaller output current for a larger load amount. Thus, the deterioration of the fuel cell system 142 or the power generation unit 340 can be suppressed and the progress of the deterioration can be adjusted.

According to one embodiment, when the value of the load amount is within a predetermined numeric range and the output current indicated by the adjustment result of the output adjustment unit 450 is within the tolerable range determined by the tolerable range determination unit 474, the output current determination unit 478 determines to generate power with the output current indicated by the adjustment result of the output adjustment unit 450. In this case, when the output current indicated by the adjustment result of the output adjustment unit 450 exceeds the upper limit value of the tolerable range determined by the tolerable range determination unit 474, the output current determination unit 478 may determine to generate power with the upper limit value determined by the tolerable range determination unit 474. When the output current indicated by the adjustment result of the output adjustment unit 450 falls below the lower limit value of the tolerable range determined by the tolerable range determination unit 474, the output current determination unit 478 may determine to generate power with the lower limit value determined by the tolerable range determination unit 474.

According to another embodiment, when the value of the load amount exceeds the upper limit value of the predetermined numeric range, the output current determination unit 478 determines to generate power with an output current smaller than the output current indicated by the adjustment result of the output adjustment unit 450. The output current determination unit 478 may determine the output current to set a smaller output current for a larger load amount, without reaching the output current indicated by the adjustment result of the output adjustment unit 450.

In this case, the output current determination unit 478 may determine to generate power with an output current smaller than the reference value determined by the tolerable range determination unit 474. The output current determination unit 478 may determine the output current to set a smaller output current for a larger load amount, without reaching the reference value determined by the tolerable range determination unit 474.

In the present embodiment, the load information may include at least one of the information indicating the current amount of the electric motor of at least one of the vehicle driving unit 222 and the air conditioning unit 224 and the information indicating the rotation speed of the electric motor. When a ratio of the rotation speed of each electric motor to the current amount of the electric motor is smaller than a predetermined value, the output current determination unit 478 may determine to increase the output current within the tolerable range determined by the tolerable range determination unit 474.

Similarly, when a ratio of the rotation speed of the electric motor of the vehicle driving unit 222 to the current value of the load amount of the vehicle driving unit 222 estimated by the estimation unit 472 is smaller than a predetermined value, the output current determination unit 478 may determine to increase the output current within the tolerable range determined by the tolerable range determination unit 474. When a ratio of the rotation speed of the electric motor of the air conditioning unit 224 to the current value of the load amount of the air conditioning unit 224 estimated by the estimation unit 472 is smaller than a predetermined value, the output current determination unit 478 may determine to increase the output current within the tolerable range determined by the tolerable range determination unit 474.

In the present embodiment, details of the power control unit 148 is described in an example where the air conditioning power estimation unit 440 estimates the power or power amount consumed by the air conditioning unit 224. However, the power control unit 148 is not limited to the present embodiment. In another embodiment, the estimation unit 472 may estimate the power or power amount consumed by the air conditioning unit 224.

The load information acquisition unit 426 may be an example of the load amount acquisition unit. The air conditioning power estimation unit 440 may be an example of the power estimation unit. The power generation control unit 470 may be an example of the control device and an output condition determination unit. The estimation unit 472 may be an example of the load estimation unit and the deterioration estimation unit. The tolerable range determination unit 474 may be an example of the first upper limit value determination unit and the second upper limit value determination unit. The output rate determination unit 476 may be an example of the output condition determination unit. The output current determination unit 478 may be an example of the output condition determination unit.

FIG. 5 schematically shows an example of a data table 500. The data table 500 may be an example of power generation information acquired by the power generation information acquisition unit 422. The data table 500 may be an example of the power generation history of the fuel cell system 142.

In the present embodiment, the data table 500 stores information indicating a time point 522, information indicating an output 524 of the power generation unit 340 at each time point, and information indicating an operation status 526 of the power generation unit 340 at each time point, in association with each other. The information indicating the output 524 may include information indicating at least one of the output voltage, output current, and output rate. The information indicating the operation status 526 may include information indicating at least one of temperature, humidity, operation mode, and operation state.

Examples of the operation mode include (i) an output prioritized mode in which the magnitude of the output or output rate of the fuel cell system 142 is prioritized over the fuel efficiency, (ii) a fuel efficiency prioritized mode in which a lower fuel consumption of the fuel cell system 142 is prioritized over the magnitude of the output or output rate, (iii) a deterioration suppression mode in which suppression of the progress of the deterioration of the fuel cell system 142 is prioritized over the fuel efficiency or the magnitude of the output or output rate. Other examples of the operation mode includes a maintenance mode in which maintenance is performed on at least a part of the fuel cell system 142 and a diagnosis mode in which diagnosis is performed on the deterioration state the fuel cell system 142. Examples of the operation state include a normal operation, idle operation, and the like. As described above, examples of the normal operation include (i) an operation in which the output of the fuel cell system 142 is varied in accordance with the variation of the required power or power amount, (ii) an operation in which the output of the fuel cell system 142 is maintained at a set constant value, regardless of the variation of the required power or power amount, or the like.

FIG. 6 schematically shows an example of a data table 600. The data table 600 may be an example of the specification information acquired by the specification information acquisition unit 424. The data table 600 may be an example of the deterioration property of the power generation stack of the fuel cell system 142. The data table 600 may be an example of the model used for estimating the deterioration of the power generation stack of the fuel cell system 142. The data table 600 may be an example of information indicating the design life of the power generation stack of the fuel cell system 142.

In the present embodiment, the data table 600 stores information indicating an elapsed time after the shipment 632, information indicating a cumulative running time 634, information indicating a cumulative power generation amount 636, and information indicating a deterioration level scheduled value 642, in association with each other. The data table 600 may include information indicating that the power generation stack of the fuel cell system 142 reaches the design life expectancy, when at least one of the elapsed time after the shipment 632, the cumulative running time 634, the cumulative power generation amount 636, and the deterioration level scheduled value 642 reaches a particular numerical value. The data table 600 may be a data table storing data on the power generation stack within a range of the design life.

Figure 7:
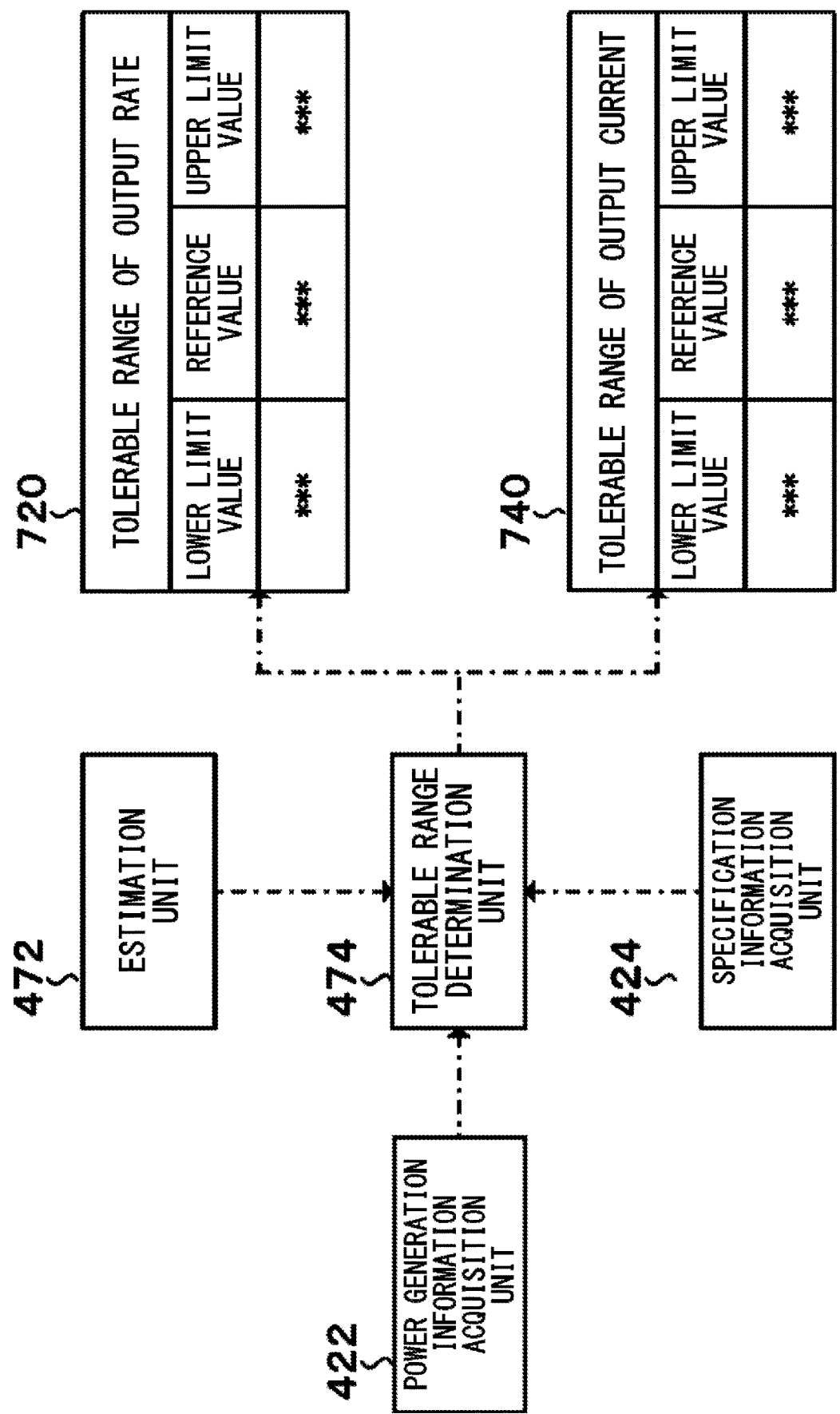
FIG. 7 schematically shows an example of information processing by a tolerable range determination unit 474.
Figure 9:
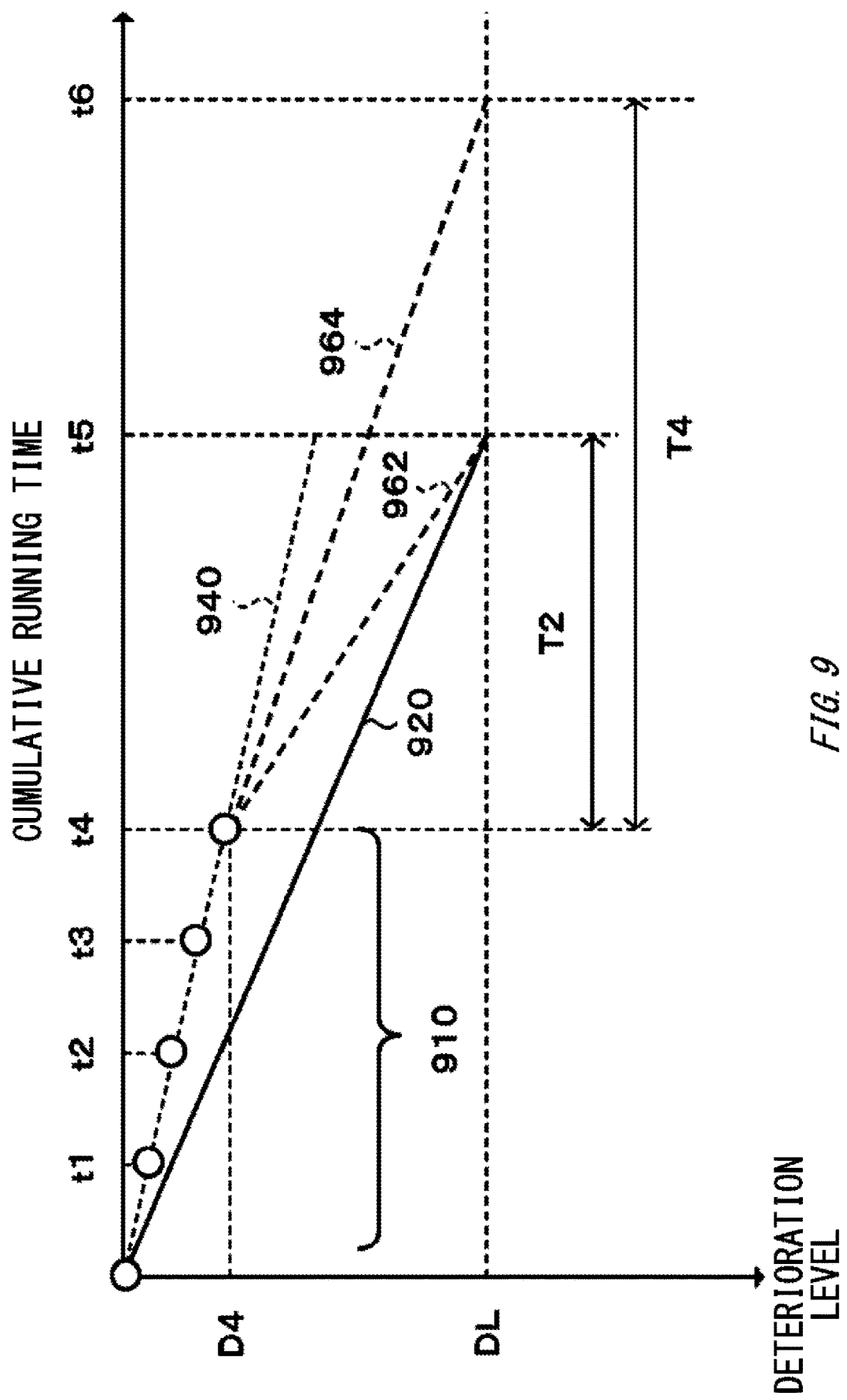
FIG. 9 schematically shows an example of a progress of deterioration of a power generation unit 340.

An example of a method of determining at least one of the output rate, output current, and output power of the fuel cell unit 310 by the tolerable range determination unit 474 is described with reference to FIG. 7, FIG. 8, and FIG. 9. FIG. 7 schematically shows an example of information processing by the tolerable range determination unit 474. FIG. 8 schematically shows an example a data table 800 indicating the progress of deterioration of the power generation unit 340. FIG. 9 schematically shows an example of a graph illustrating the progress of the deterioration of the power generation unit 340.

As illustrated in FIG. 7, the tolerable range determination unit 474 may acquire the power generation information from the power generation information acquisition unit 422. The tolerable range determination unit 474 acquires information indicating the data table 600 and an initial condition of the tolerable range of the output rate and output current from the specification information acquisition unit 424. The tolerable range determination unit 474 may acquire information indicating a shipment time point from the specification information acquisition unit 424. The tolerable range determination unit 474 acquires the estimation result of the current value of the deterioration level from the estimation unit 472 at any timing. The tolerable range determination unit 474 periodically acquires the estimation result of the current value of the deterioration level from the estimation unit 472 for example.

Next, the tolerable range determination unit 474 generates a data table 800 by referring to the data table 600. In the present embodiment, the data table 800 stores information indicating a time point 822, information indicating an elapsed time after the shipment 832, information indicating a cumulative running time 834, information indicating a cumulative power generation amount 836, and information indicating a deterioration level 842 in association with each other. The deterioration level 842 may include a scheduled value of the deterioration level 842 and a current value of the deterioration level 842.

The scheduled value of the deterioration level 842 may be calculated using the data table 600. For example, the tolerable range determination unit 474 uses the data table 600 to establish a function or machine learning model using the scheduled value of the deterioration level as the objective variable, and using at least one of the elapsed time after the shipment, the cumulative running time, and the cumulative power generation amount as the explanatory variable. The tolerable range determination unit 474 can calculate the elapsed time after the shipment at any time point by using the information indicating the shipment time point acquired from the specification information acquisition unit 424. The cumulative running time and cumulative power generation amount at any time point can be calculated by referring to the power generation information. The tolerable range determination unit 474 can acquire the scheduled value of the deterioration level 842 at any time point by inputting these pieces of information to the above-described function or machine learning model.

Next, the tolerable range determination unit 474 generates a tolerable range 720 of the output rate of the fuel cell system 142 or the power generation unit 340 by referring to the data table 800. For example, the tolerable range determination unit 474 generates the tolerable range 720 of the output rate by changing the upper limit value in the initial condition of the tolerable range of the output rate.

The tolerable range determination unit 474 generates a tolerable range 740 of the output current of the fuel cell system 142 or the power generation unit 340 by referring to the data table 800. For example, the tolerable range determination unit 474 generates the tolerable range 740 of the output current by changing the upper limit value in the initial condition of the tolerable range of the output current.

An overview of a procedure of generating the tolerable range 720 of the output rate by the tolerable range determination unit 474 will be described by using FIG. 9. In FIG. 9, circle marks 910 indicate the cumulative running time and deterioration level at respective time points. In the present embodiment, t4 indicates the current cumulative running time, and D4 indicates the deterioration level at t4. The design life expectancy is scheduled to be reached at cumulative running time t5. In the present embodiment, a larger value of the deterioration level indicates further progress of the deterioration of the fuel cell system 142.

A solid line 920 corresponds to the scheduled value of the deterioration level in a case where the cumulative running time is employed as the explanatory variable of the deterioration level. It should be noted that the explanatory variable of the deterioration level is not limited to the cumulative running time as described above. A dotted line 940 indicates an approximate function of the circle marks 910. The dotted line 940 corresponds to the predicted value of the progress of the deterioration of the fuel cell system 142 or power generation unit 340 in a case where the current use condition continues.

According to an embodiment illustrated in FIG. 9, the current value of the deterioration level 842 is smaller than the scheduled value of the deterioration level 842 at the cumulative running time t4. Thus, the output rate can be further increased. Thus, in one embodiment, the tolerable range determination unit 474 determines an output rate with which the deterioration level can be DL at the cumulative running time t5. Thus, the tolerable range determination unit 474 determines the output rate with which the relationship between the cumulative running time and the deterioration level as represented by a dotted line 962 is obtained. In another embodiment, the tolerable range determination unit 474 determines an output rate with which the deterioration level can be DL at a cumulative running time t6. The cumulative running time t6 may be a value larger than the cumulative running time t5. Thus, the tolerable range determination unit 474 determines the output rate with which the relationship between the cumulative running time and the deterioration level as represented by a dotted line 964 is obtained.

The tolerable range determination unit 474 may employ these output rates as the upper limit value of the tolerable range 720. The tolerable range determination unit 474 may generate the tolerable range 740 of the output current through a procedure similar to that for the tolerable range of the output rate 720.

Figure 10:
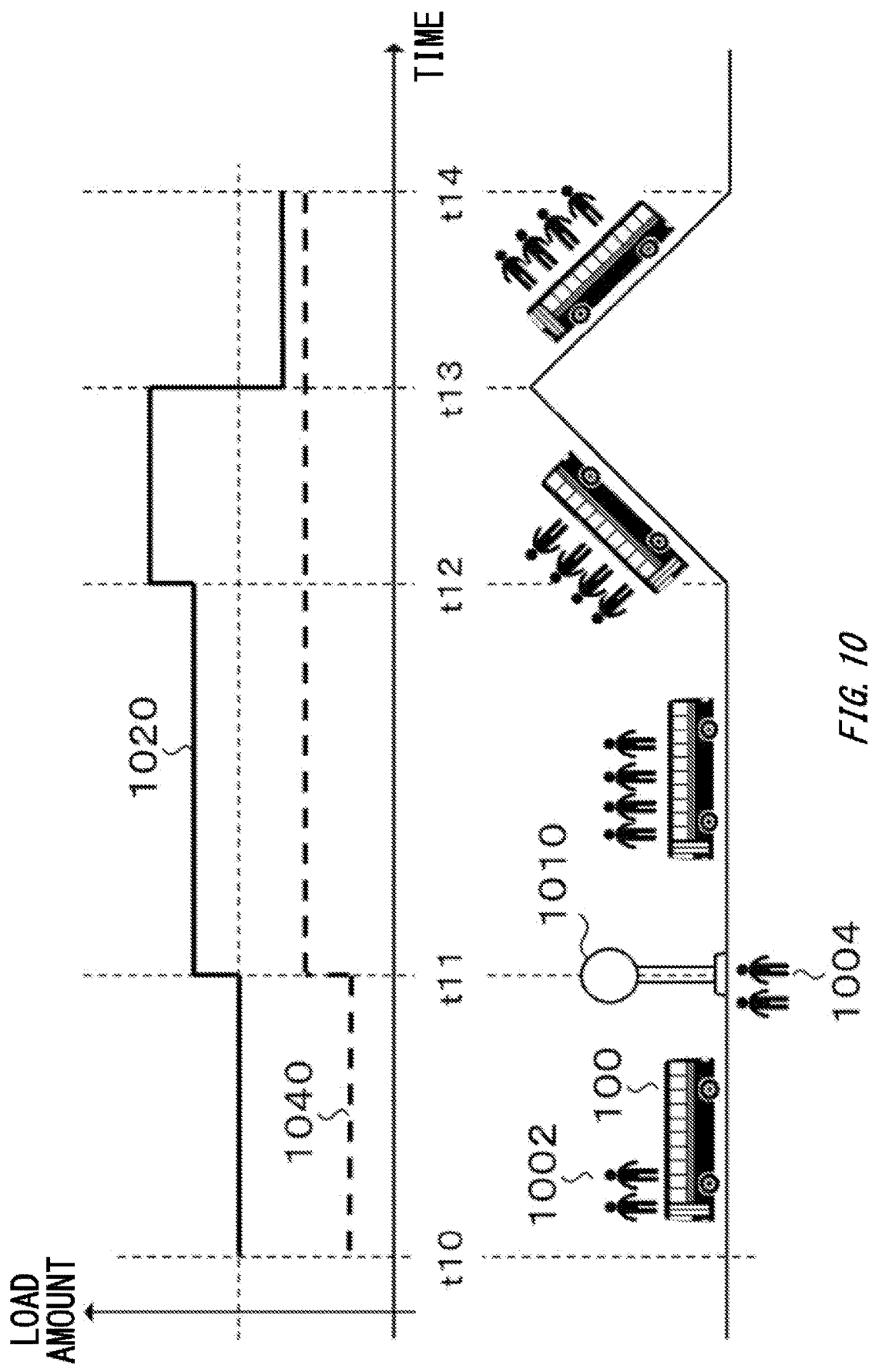
FIG. 10 schematically shows an example of a load variation of the vehicle 100.
Figure 11:
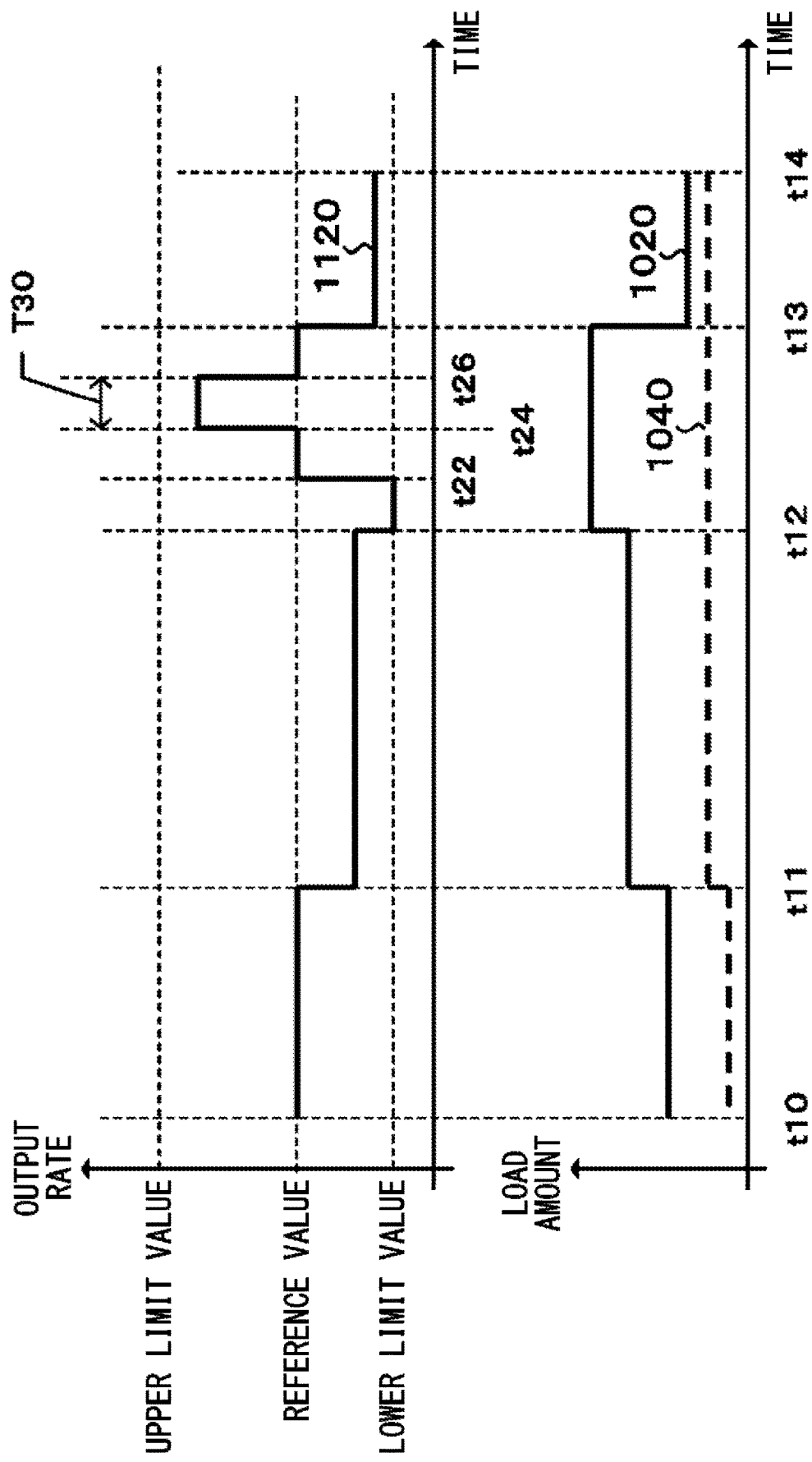
FIG. 11 schematically shows an example of variation of an output rate of a fuel cell unit 310.

An example of a method of adjusting the output rate of the fuel cell unit 310 in accordance with the load amount, by the output rate determination unit 476 will be described with reference to FIG. 10 and FIG. 11. FIG. 10 schematically shows an example of load variation of the vehicle 100. FIG. 11 schematically shows an example of variation of the output rate of the fuel cell unit 310.

As illustrated in FIG. 10, the vehicle 100 travels with a passenger 1002 accommodated in the accommodation unit 160 at a time point t10. At a time point t11, the vehicle 100 makes a brief stop at a stop 1010 to pick up a passenger 1004. Then, the vehicle 100 starts traveling again. The vehicle 100 travels uphill between a time point t12 and a time point t13. The vehicle 100 travels downhill between a time point t13 and a time point t14. In this case, the load amount of the vehicle driving unit 222 varies as indicated by a solid line 1020. The load amount of the air conditioning unit 224 varies as indicated by a dotted line 1040.

As illustrated in FIG. 11, under the situation described with reference to FIG. 10, the tolerable range determination unit 474 first determines the tolerable range 720 of the output rate. Next, the output rate determination unit 476 makes the output rate of the fuel cell unit 310 vary as indicated by a solid line 1120.

Specifically, first of all, in a period between the time points t10 and t11, the output rate determination unit 476 sets the output rate of the fuel cell unit 310 to the reference value of the tolerable range 720. Next, in a period between the time points t11 and t12, the load amount of the work unit 122 is larger than that in the period between the time points t10 and t11. Thus, the output rate determination unit 476 sets the output rate of the fuel cell unit 310 to be a value smaller than the reference value of the tolerable range 720.

Next, in a period between the time points t12 and t13, the load amount of the work unit 122 is larger than that in the period between the time points t11 and t12. Thus, the output rate determination unit 476 further reduces the output rate of the fuel cell unit 310, to set the output rate to the lower limit value of the tolerable range 720.

In the present embodiment, it is assumed that a state where the rotation speed of the vehicle driving unit 222 with respect to the load of the vehicle driving unit 222 is smaller than a predetermined value has continued for a predetermined period of time as a result of continuing the operation with the output rate of the fuel cell unit 310 set to the lower limit value of the tolerable range 720. Thus, the output rate determination unit 476 determines to temporarily increase the output rate. Specifically, the output rate determination unit 476 sets the output rate to the reference value of the tolerable range 720, in a period between time points t22 and t24.

In the present embodiment, it is assumed that a state where the rotation speed of the vehicle driving unit 222 with respect to the load of the vehicle driving unit 222 is smaller than a predetermined value has continued for a predetermined period of time even when the operation has continued with the output rate of the fuel cell unit 310 set to the reference value of the tolerable range 720. Thus, the output rate determination unit 476 determines to increase the output rate again. Specifically, the output rate determination unit 476 sets the output rate to a value larger than the reference value of the tolerable range 720, in a period between the time point t24 and a time point t26. A duration T30 of the period between the time points t24 and t26 is set to be smaller than the upper limit value of a period in which the output rate may exceed the reference value.

Then, at the time point t26 the output rate determination unit 476 sets the output rate to be the reference value of the tolerable range 720. In the period between the time points t13 and t14, the load of the work unit 122 is smaller than a predetermined value. Thus, the output rate determination unit 476 sets the output rate of the fuel cell unit 310 to be value smaller than the reference value of the tolerable range 720.

As described above, with the present embodiment, the output rate of the fuel cell system 142 or the power generation unit 340 is appropriately set in accordance with the load variation of the work unit 122 during the work period of the vehicle 100. Thus, the deterioration of the power generation stack of the power generation unit 340 is suppressed. With the upper limit value of the output rate adjusted, the progress of the deterioration of the power generation stack of the power generation unit 340 may be appropriately adjusted.

Figure 12:
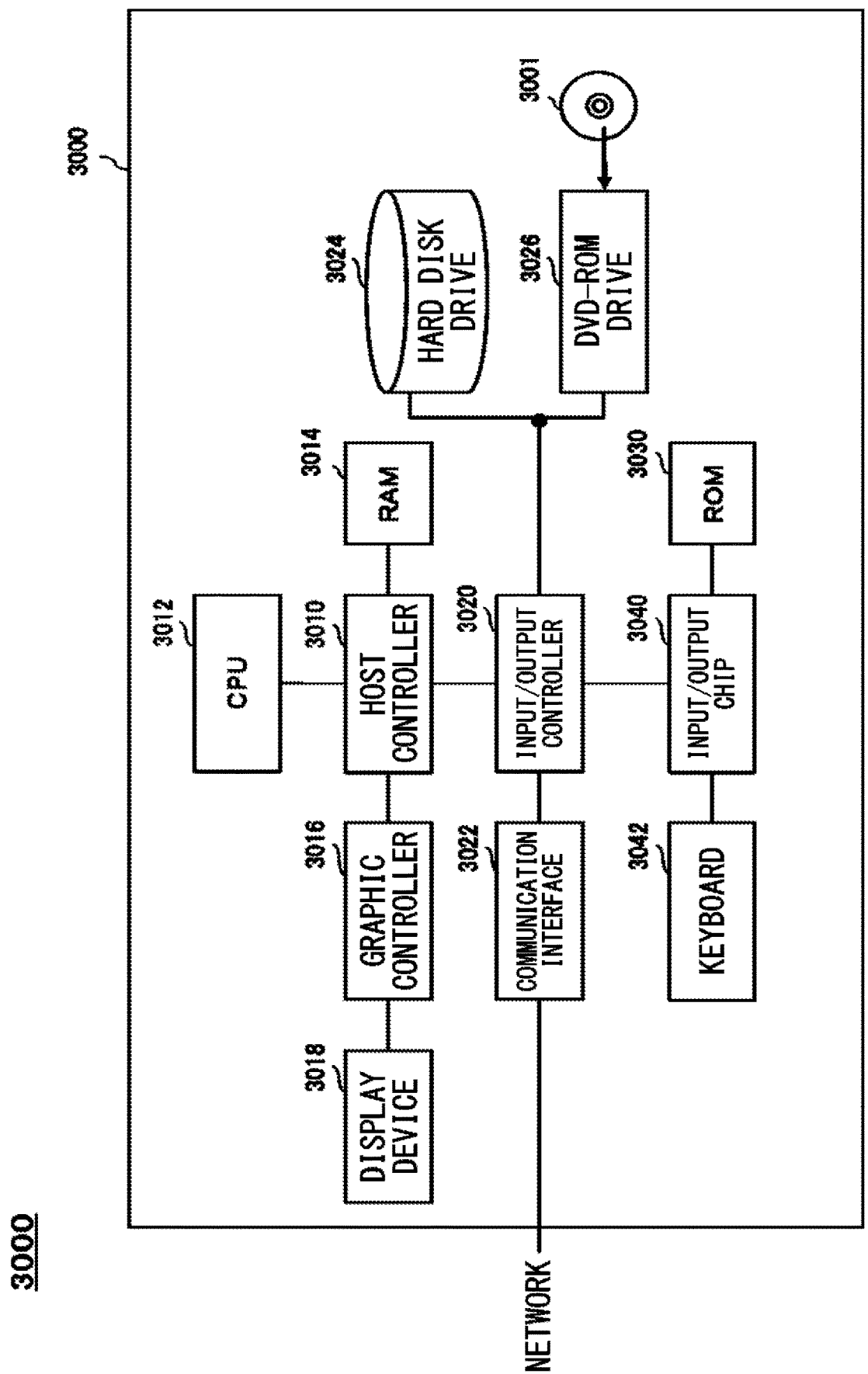
FIG. 12 schematically shows an example of a system configuration of a computer 3000.

FIG. 12 shows an example of a computer 3000 in which a plurality of aspects of the present invention may be wholly or partly embodied. Apart of the vehicle 100 may be realized by the computer 3000. For example, at least one of the vehicle control unit 124, the power control unit 148 and the FC control unit 330 is realized by the computer 3000.

A program that is installed in the computer 3000 can cause the computer 3000 to perform operations associated with apparatuses of the embodiments of the present invention or to function as one or a plurality of "units" thereof, and/or cause the computer 3000 to perform processes of the embodiments of the present invention or steps thereof. Such program may be performed by a CPU 3012, so as to make the computer 3000 perform particular operation associated with some or all of the flowcharts and the blocks of the block diagrams described in this specification.

The computer 3000 according to the present embodiment includes the CPU 3012, a RAM 3014, a graphic controller 3016, and a display device 3018, and they are connected to each other by a host controller 3010. The computer 3000 further includes a communication interface 3022, a hard disk drive 3024, a DVD-ROM drive 3026, and an input/output unit such as an IC card drive, and they are connected to the host controller 3010 via an input/output controller 3020. The computer further includes a ROM 3030 and a legacy input/output unit such as a keyboard 3042, and they are connected to the input/output controller 3020 via an input/output chip 3040.

The CPU 3012 operates in accordance with the program stored in the ROM 3030 and the RAM 3014, and controls respective units by them. The graphic controller 3016 acquires image data created by the CPU 3012 on a frame buffer or the like provided in the RAM 3014 or in itself, and causes the image data to be displayed on the display device 3018.

The communication interface 3022 communicates with other electronic devices via the network. The hard disk drive 3024 stores the program and data to be used by the CPU 3012 in the computer 3000. The DVD-ROM drive 3026 reads a program or data from the DVD-ROM 3001, and provides the program or data to the hard disk drive 3024 via the RAM 3014. The IC card drive reads the program and data from the IC card, and/or writes the program and data to the IC card.

The ROM 3030 stores a boot program, etc. executed by the computer 3000 at the time of activation, and/or a program dependent on the hardware of the computer 3000. The input/output chip 3040 may connect various input/output units to the input/output controller 3020, via a parallel port, a serial port, a keyboard port, a mouse port, etc.

A program is provided by a computer-readable storage medium like the DVD-ROM 3001 or the IC card. A program is read from the computer-readable storage medium, and installed in the hard disk drive 3024, the RAM 3014 or the ROM 3030, which are the examples of computer-readable storage media, and then executed by the CPU 3012. The information processing described in these programs is read into the computer 3000, resulting in cooperation between a program and the above-mentioned various types of hardware resources. A device or method may be configured by realizing an operation or processing of information in accordance with the use of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under control of the CPU 3012, reads transmission data stored on a transmission buffering region provided in a recording medium such as the RAM 3014, the hard disk drive 3024, the DVD-ROM 3001, or the IC card, and transmits the read transmission data to a network or writes reception data received from a network to a reception buffering region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and perform various types of processing on the data on the RAM 3014. The CPU 3012 may then write back the processed data to the external recording medium.

Various types of programs, data, table and various types of information such as a database may be stored in a recording medium and subjected to information processing. The CPU 3012 may perform various types of processing on the data read from the RAM 3014, which includes various types of operations, processing of information, condition judging, conditional branch, unconditional branch, search/replace of information, and the like, as described throughout this disclosure and designated by an instruction sequence of programs, and writes the result back to the RAM 3014. In addition, the CPU 3012 may search for information in a file, a database, and the like, in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The above-explained program or software modules may be stored in the computer-readable storage media on or near the computer 3000. In addition, a recording medium such as a hard disk or a RAM provided in a server system connected to a dedicated communication network or the Internet can be used as the computer-readable storage media, thereby providing the program to the computer 3000 via the network.

While the embodiments of the present invention have been described, the technical scope of the invention is not limited to the embodiments. It is apparent to persons skilled in the art that various alterations and improvements can be added to the above-described embodiments. Also, to the extent not being technically inconsistent, matters explained about particular embodiment can be applied to other embodiments. Moreover, each component may have characteristics similar to those of other components which have the same name and have the different numerals. It is also apparent from the scope of the claims that the embodiments added with such alterations or improvements may be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST

100 vehicle
120 power using unit
122 work unit
124 vehicle control unit
140 power source system
142 fuel cell system
144 power accumulation unit
146 power convertingunit
148 power control unit
160 accommodation unit
222 vehicle driving unit
224 air conditioning unit
230 work equipment monitor unit
232 current amount detection unit
234 rotation speed detection unit
240 work environment monitor unit
242 load cell
244 gyrosensor
246 in-vehicle camera
248 temperature sensor
262 device control unit
264 load management unit
266 power request unit
310 fuel cell unit
312 fuel supply unit
314 oxidant agent supply unit
316 temperature regulation medium supply unit
322 communication connector
324 power connector
326 power generation utility connector
330 FC control unit
340 power generation unit
350 auxiliary battery
422 power generation information acquisition unit
424 specification information acquisition unit
426 load information acquisition unit
428 power request acquisition unit
440 air conditioning power estimation unit
450 output adjustment unit
460 power accumulation control unit
470 power generation control unit
472 estimation unit
474 tolerable range determination unit
476 output rate determination unit
478 output current determination unit
500 data table
522 time point
524 output
526 operation status
600 data table
632 elapsed time
634 cumulative running time 636 cumulative power generation amount
642 scheduled value
720 tolerable range
740 tolerable range
800 data table
822 time point
832 elapsed time
834 cumulative running time
836 cumulative power generation amount
842 deterioration level
910 circle mark
920 solid line
940 dotted line
962 dotted line
964 dotted line
1002 passenger
1004 passenger
1010 stop
1020 solid line
1040 dotted line
1120 solid line
3000 computer
3001 DVD-ROM
3010 host controller
3012 CPU
3014 RAM
3016 graphic controller
3018 display device
3020 input/output controller
3022 communication interface
3024 hard disk drive
3026 DVD-ROM drive
3030 ROM
3040 input/output chip
3042 keyboard

What is claimed is:

1. A control device for controlling a power supply device that supplies power to a work machine, the power supply device including a fuel cell and a power accumulation unit, the control device comprising:
   a load amount acquisition unit configured to acquire load information indicating a load amount of the work machine during a work period of the work machine; and
   an output condition determination unit configured to determine an output rate of the fuel cell based on the load amount indicated by the load information, during the work period, wherein
   the output rate of the fuel cell is (i) a magnitude of power that the fuel cell can output per unit time or (ii) a ratio of the magnitude of the power that the fuel cell can output per unit time to a rated value of power generation performance of the fuel cell,
   the output condition determination unit includes a first tolerable range determination unit configured to determine, based on the load amount indicated by the load information, an upper limit value, a reference value, and a lower limit value of at least one of the output rate or output current of the fuel cell, the reference value being smaller than the upper limit value and larger than the lower limit value,
   the first tolerable range determination unit determines the upper limit value of the at least one of the output rate or the output current of the fuel cell such that the upper limit value of the at least one of the output rate or the output current becomes smaller (i) as the load amount gets larger, (ii) as a duration of a period, in which the load amount exceeds the reference value, gets longer, or (iii) as a frequency at which the load amount exceeds the reference value gets higher, and
   the first tolerable range determination unit determines, based on a statistic value of the load amount and a rated output and a rated capacity of the power accumulation unit, the reference value of the at least one of the output rate or the output current.

2. The control device according to claim 1, wherein the work period is a period starting when information indicating start of work of the work machine is received and ending when information indicating end of the work of the work machine is received.

3. The control device according to claim 1, wherein the load information includes at least one of (i) information indicating a load amount of at least one of one or a plurality of electrically-powered equipment pieces that implement work and (ii) information related to a work environment of the work machine.

4. The control device according to claim 2, wherein the load information includes at least one of (i) information indicating a load amount of at least one of one or a plurality of electrically-powered equipment pieces that implement the work and (ii) information related to a work environment of the work machine.

5. The control device according to claim 3, wherein
   the load information includes the information related to the work environment of the work machine, and
   the output condition determination unit includes
   a load estimation unit configured to estimate the load amount based on the information related to the work environment, and
   a first upper limit value determination unit configured to determine at least one of (i) the upper limit value of the output rate of the fuel cell, (ii) the upper limit value of the output current of the fuel cell, and (iii) an upper limit value of output power of the fuel cell, based on the load amount estimated by the load estimation unit.

6. The control device according to claim 1, wherein
   the output condition determination unit includes
   a deterioration estimation unit configured to estimate a deterioration level indicating a progress level of deterioration of the fuel cell, and
   a second upper limit value determination unit configured to determine at least one of (i) the upper limit value of the output rate of the fuel cell, (ii) the upper limit value of the output current of the fuel cell, and (iii) an upper limit value of output power of the fuel cell based on the deterioration level estimated by the deterioration estimation unit.

7. The control device according to claim 2, wherein
   the output condition determination unit includes
   a deterioration estimation unit configured to estimate a deterioration level indicating a progress level of deterioration of the fuel cell, and
   a second upper limit value determination unit configured to determine at least one of (i) the upper limit value of the output rate of the fuel cell, (ii) the upper limit value of the output current of the fuel cell, and (iii) an upper limit value of output power of the fuel cell based on the deterioration level estimated by the deterioration estimation unit.

8. The control device according to claim 3, wherein
   the output condition determination unit includes
   a deterioration estimation unit configured to estimate a deterioration level indicating a progress level of deterioration of the fuel cell, and a second upper limit value determination unit configured to determine at least one of (i) the upper limit value of the output rate of the fuel cell, (ii) the upper limit value of the output current of the fuel cell, and (iii) an upper limit value of output power of the fuel cell based on the deterioration level estimated by the deterioration estimation unit.

9. The control device according to claim 1, wherein
the work machine further includes
an accommodation unit configured to accommodate at least one of a human and an item,
an air conditioning unit configured to adjust an air environment in the accommodation unit, and
a driving unit configured to move the work machine or the accommodation unit,
the control device further includes a power estimation unit configured to estimate power or a power amount consumed by the air conditioning unit, and
the output condition determination unit determines the output rate of the fuel cell based on the power or the power amount estimated by the power estimation unit.

10. The control device according to claim 2, wherein
the work machine further includes
an accommodation unit configured to accommodate at least one of a human and an item,
an air conditioning unit configured to adjust an air environment in the accommodation unit, and
a driving unit configured to move the work machine or the accommodation unit,
the control device further includes a power estimation unit configured to estimate power or a power amount consumed by the air conditioning unit, and
the output condition determination unit determines the output rate of the fuel cell based on the power or the power amount estimated by the power estimation unit.

11. The control device according to claim 3, wherein
the work machine further includes
an accommodation unit configured to accommodate at least one of a human and an item,
an air conditioning unit configured to adjust an air environment in the accommodation unit, and
a driving unit configured to move the work machine or the accommodation unit,
the control device further includes a power estimation unit configured to estimate power or a power amount consumed by the air conditioning unit, and
the output condition determination unit determines the output rate of the fuel cell based on the power or the power amount estimated by the power estimation unit.

12. The control device according to claim 1, wherein the power supply device is detachably attached to the work machine.

13. The control device according to claim 2, wherein the power supply device is detachably attached to the work machine.

14. A power supply device comprising:
the control device according to claim 1; and
a fuel cell.

15. A work machine comprising:
the power supply device according to claim 14; and
an electric motor configured to convert electric energy supplied from the power supply device into mechanical energy.

16. A non-transitory computer-readable recording medium storing a program, when executed by a computer, that causes the computer to perform a control method of controlling a power supply device that supplies power to a work machine, the power supply device including a fuel cell and a power accumulation unit, the control method comprising:
acquiring load information indicating a load amount of the work machine during a work period of the work machine; and
determining an output rate of the fuel cell based on the load amount indicated by the load information, during the work period, wherein
the output rate of the fuel cell is (i) a magnitude of power that the fuel cell can output per unit time or (ii) a ratio of the magnitude of the power that the fuel cell can output per unit time to a rated value of power generation performance of the fuel cell,
determining the output rate includes determining, based on the load amount indicated by the load information, an upper limit value, a reference value, and a lower limit value of at least one of the output rate or output current of the fuel cell, the reference value being smaller than the upper limit value and larger than the lower limit value,
determining the upper limit value, the reference value, and the lower limit value of the at least one of the output rate or the output current of the fuel cell includes:
determining the upper limit value of the at least one of the output rate or the output current of the fuel cell such that the upper limit value of the at least one of the output rate or the output current becomes smaller (i) as the load amount gets larger, (ii) as a duration of a period, in which the load amount exceeds the reference value, gets longer, or (iii) as a frequency at which the load amount exceeds the reference value gets higher; and
determining, based on a statistic value of the load amount and a rated output and a rated capacity of the power accumulation unit, the reference value of the at least one of the output rate or the output current.

17. A control method of controlling a power supply device that supplies power to a work machine, the power supply device including a fuel cell and a power accumulation unit, the control method comprising:
acquiring load information indicating a load amount of the work machine during a work period of the work machine; and
determining an output rate of the fuel cell based on the load amount indicated by the load information, during the work period, wherein
the output rate of the fuel cell is (i) a magnitude of power that the fuel cell can output per unit time or (ii) a ratio of the magnitude of the power that the fuel cell can output per unit time to a rated value of power generation performance of the fuel cell,
determining the output rate includes determining, based on the load amount indicated by the load information, an upper limit value, a reference value, and a lower limit value of at least one of the output rate or output current of the fuel cell, the reference value being smaller than the upper limit value and larger than the lower limit value,
determining the upper limit value, the reference value, and the lower limit value of the at least one of the output rate or the output current of the fuel cell includes:
determining the upper limit value of the at least one of the output rate or the output current of the fuel cell such that the upper limit value of the at least one of the output rate or the output current becomes smaller (i) as the load amount gets larger, (ii) as a duration of a period, in which the load amount exceeds the reference value, gets longer, or (iii) as a frequency at which the load amount exceeds the reference value gets higher; and determining, based on a statistic value of the load amount and a rated output and a rated capacity of the power accumulation unit, the reference value of the at least one of the output rate or the output current.

18. The control device according to claim 3, wherein the output condition determination unit includes a first upper limit value determination unit configured to determine the upper limit value of the output rate of the fuel cell based on the load amount indicated by the load information.

19. The control device according to claim 18, wherein the first upper limit value determination unit determines the upper limit value of the output rate of the fuel cell such that the upper limit value of the output rate of the fuel cell becomes smaller (i) M the load amount gets larger, (ii) as the duration of the period in which the load amount exceeds the reference value gets longer, or (iii) as a frequency at which the load amount exceeding the reference value gets higher.

20. The control device according to claim 6, wherein the second upper limit value determination unit determines the upper limit value of the output rate of the fuel cell such that the upper limit value of the output rate of the fuel cell becomes larger, as a delay of a progress level of the deterioration estimated by the deterioration estimation unit gets larger than a progress level of the deterioration indicated by a scheduled value of the deterioration level of the fuel cell.

21. A control device for controlling a power supply device that supplies power to a work machine, the power supply device including a fuel cell and a power accumulation unit, the control device comprising:

a load amount acquisition unit configured to acquire load information indicating a load amount of the work machine during a work period of the work machine; and an output condition determination unit configured to determine an output rate of the fuel cell based on the load amount indicated by the load information, during the work period, wherein the output rate of the fuel cell is (i) a magnitude of power that the fuel cell can output per unit time or (ii) a ratio of the magnitude of the power that the fuel cell can output per unit time to a rated value of power generation performance of the fuel cell, the load information includes information about a current value of the load amount and a predicted value of the load amount at a particular time point in future, the output condition determination unit includes a first tolerable range determination unit configured to determine, based on the load amount indicated by the load information, an upper limit value, a reference value, and a lower limit value of at least one of the output rate or output electric current of the fuel cell, the reference value being smaller than the upper limit value and larger than the lower limit value, the first tolerable range determination unit determines the upper limit value of the at least one of the output rate or the output electric current of the fuel cell such that the upper limit value of the at least one of the output rate or the output electric current becomes smaller (i) as a difference between the current value of the load amount and the predicted value of the load amount gets smaller or (ii) a ratio of the current value of the load amount to the predicted value of the load amount gets smaller, and the first tolerable range determination unit determines, based on a statistic value of the load amount and a rated output and a rated capacity of the power accumulation unit, the reference value of the at least one of the output rate or the output electric current.

22. A control device for controlling a power supply device that supplies power to a work machine, the work machine including an electric motor configured to convert electric energy supplied from the power supply device into mechanical energy, the power supply device including a fuel cell, the control device comprising:

a load amount acquisition unit configured to acquire load information indicating a load amount of the work machine during a work period of the work machine; and an output condition determination unit configured to determine an output rate of the fuel cell based on the load amount indicated by the load information, during the work period, wherein the output rate of the fuel cell is (i) a magnitude of power that the fuel cell can output per unit time or (ii) a ratio of the magnitude of the power that the fuel cell can output per unit time to a rated value of power generation performance of the fuel cell, the load information includes (i) information indicating a rotation speed of the electric motor and (ii) information indicating an amount of electric current of the electric motor or information indicating a current value of the load amount, the output condition determination unit determines an upper limit value of at least one of the output rate or output electric current of the fuel cell, and the output condition determination unit determines to increase the at least one of the output rate or the output electric current within a range of the upper limit value of the at least one of the output rate or the output electric current when (i) a first ratio obtained by dividing the rotation speed of the electric motor by the amount of the electric current of the electric motor is smaller than a predetermined first value or (ii) a second ratio obtained by dividing the rotation speed of the electric motor by the current value of the load amount is smaller than a predetermined second value.

* * * * *